(12) United States Patent
Furumi et al.

(10) Patent No.: US 6,971,473 B2
(45) Date of Patent: Dec. 6, 2005

(54) STEERING SYSTEM FOR VEHICLE

(75) Inventors: Hiroshi Furumi, Wako (JP); Osamu Tsurumiya, Wako (JP); Kazuhiko Inaba, Wako (JP); Hisao Asaumi, Wako (JP); Yoshio Kakizaki, Wako (JP); Hirokazu Kitazawa, Wako (JP); Tomoaki Sugano, Wako (JP); Shinji Suto, Wako (JP); Hiroaki Horii, Wako (JP); Fumihiro Morishita, Wako (JP); Junichi Yoshida, Wako (JP)

(73) Assignee: Honda Giken Kogyo Kabushiki Kaisha, Minato-ku (JP)

( * ) Notice: Subject to any disclaimer, the term of this patent is extended or adjusted under 35 U.S.C. 154(b) by 4 days.

(21) Appl. No.: 10/997,705

(22) Filed: Nov. 24, 2004

(65) Prior Publication Data

US 2005/0087390 A1    Apr. 28, 2005

Related U.S. Application Data

(62) Division of application No. 10/608,524, filed on Jun. 24, 2003.

(30) Foreign Application Priority Data

Jun. 27, 2002 (JP) ............................. 2002-188003
Aug. 20, 2002 (JP) ............................. 2002-239737
Oct. 3, 2002 (JP) ............................. 2002-290812

(51) Int. Cl.⁷ ............................................. B62D 5/04
(52) U.S. Cl. ..................... 180/443; 318/34; 318/41
(58) Field of Search ................... 180/444, 446, 180/443, 402; 701/41, 42; 318/34, 41

(56) References Cited

U.S. PATENT DOCUMENTS

| 5,327,986 A | 7/1994 | Saita |
| 6,176,341 B1 * | 1/2001 | Ansari ................. 180/402 |
| 6,345,681 B1 | 2/2002 | Hackl et al. |
| 6,484,839 B2 * | 11/2002 | Cole ................... 180/402 |
| 6,548,969 B2 | 4/2003 | Ewbank et al. |
| 6,705,424 B2 | 3/2004 | Ogawa et al. |

FOREIGN PATENT DOCUMENTS

| DE | 199 02 556 A1 | 7/2000 |
| DE | 100 15 050 A1 | 9/2001 |
| JP | 6-344927 | 12/1994 |
| JP | 2001151125 A | 6/2001 |
| JP | 2001260908 A | 9/2001 |
| WO | 99/29557 | 6/1999 |

* cited by examiner

*Primary Examiner*—Tony Winner
(74) *Attorney, Agent, or Firm*—Hamre, Schumann, Mueller & Larson, P.C.

(57) ABSTRACT

Steering apparatus for transmitting a driving force of a motor through a gear mechanism to a rack shaft of a steering system and applying the driving force to steering road wheels in a steering direction. The apparatus has first and second motors. In the transmission of driving forces from output shafts of the first and second motors to the rack shaft, the phases of the two motors are essentially staggered by 180 degree.

4 Claims, 22 Drawing Sheets

FIG. 21
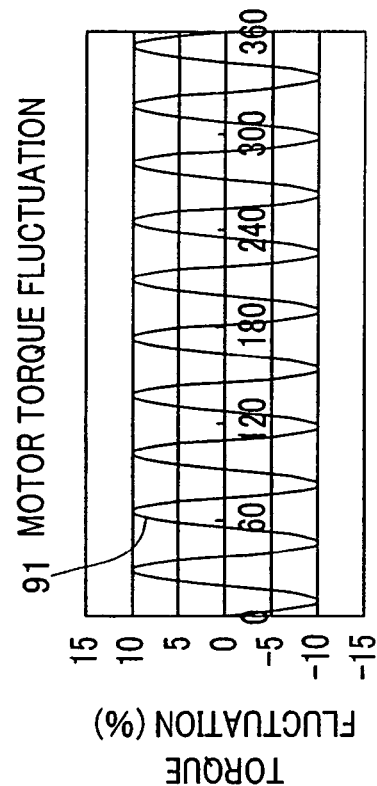
(a)
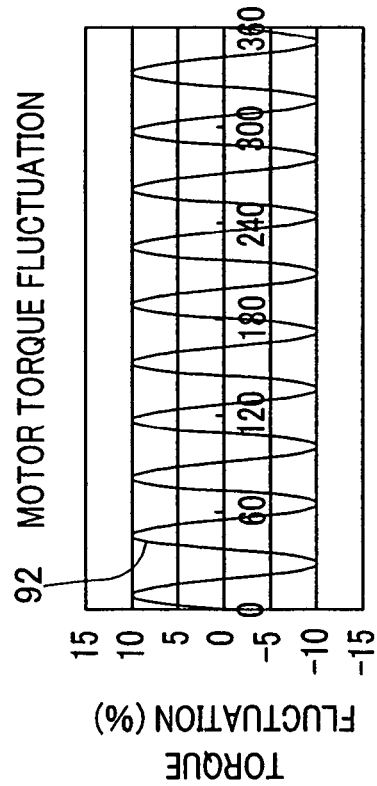
(b)
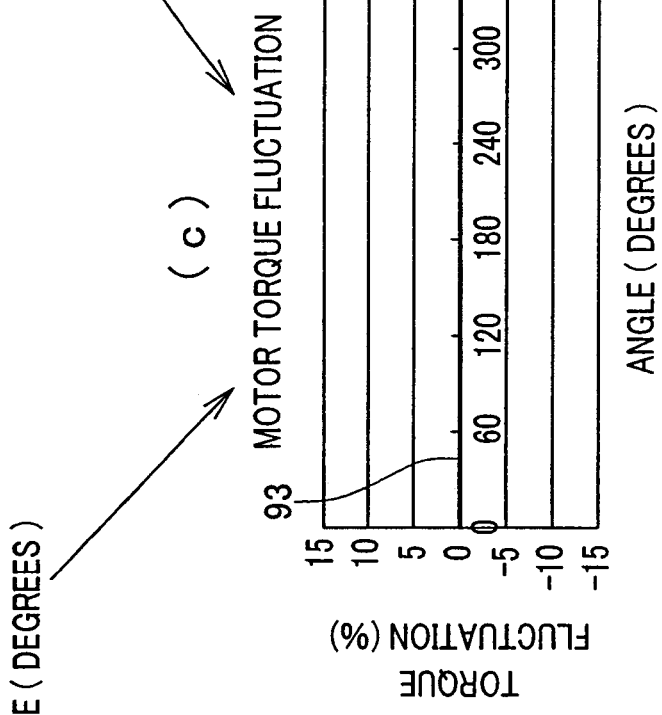
(c)

STEERING SYSTEM FOR VEHICLE

This application is a division of application Ser. No. 10/608,524, filed Jun. 24. 2003, which application is incorporated herein by reference.

FIELD OF THE INVENTION

This invention relates to a steering system for an automotive vehicle and, more particularly, to a motor driving method wherein a steering assist force is applied to a steering system by means of two motors provided in the steering system.

BACKGROUND OF THE INVENTION

Vehicular steering systems include electric power steering apparatus and steer-by-wire systems which are devoid of mechanical linkage.

An electric power steering apparatus is an auxiliary apparatus in which, when while driving a vehicle a driver turns a steering wheel, a motor is operated to provide a supplementary steering force or a steering assist force. In an electric power steering apparatus, a steering torque signal outputted from a steering torque detecting part for detecting a steering torque arising in a steering shaft when the driver turns the steering wheel, and a vehicle speed signal outputted from a vehicle speed detecting part for detecting the speed of the vehicle, are used to drive-control an assisting motor for outputting an auxiliary steering force on the basis of control operation of a motor control part, to reduce the steering force that must be applied by the driver. The motor control part sets a target current value for a motor current passing through the motor on the basis of the steering torque signal and the vehicle speed signal, obtains the difference between a signal pertaining to this target current value (a target current signal) and a motor current signal fed back from a motor current detecting part for detecting the motor current actually flowing through the motor, and performs proportional/integral compensation processing (PI control) on this difference signal to produce a signal for drive-controlling the motor.

Generally, electric power steering apparatus have been developed mainly for use in small vehicles; however, particularly in recent years, from the points of view of fuel economy and expansion of the scope of vehicle control, the need has arisen for larger vehicles (such as passenger vehicles from the 2000 cc class upward) to be provided with electric power steering. In applying an electric power steering apparatus to a large vehicle, because the weight of the vehicle is large, with a construction using a single motor, a large motor outputting a large assisting force is required. Consequently, the size of the motor is large, the freedom of layout with which it can be mounted to the vehicle (its mountability) deteriorates, furthermore a large, special non-standard motor and motor control/driving part therefor become necessary, and the cost of manufacture increases.

To overcome this, as constructions suited to electric power steering apparatus for large vehicles like this, constructions which use two assisting motors have been proposed (see, e.g., International Publication No. WO99/29557, JP-A-2001-260908, JP-A-2001-151125).

However, when an electric power steering apparatus is constructed using two motors, the following problems arise.

When two motors are used, a motor control/driving part is provided for each motor. When two motor control/driving parts are provided in a control unit (ECU), there is a risk of some variation arising between these motor control/driving parts. When such variation arises, a difference arises in the respective voltages applied to the two motors. As a result, variation arises in the motor characteristics, and differences arise in the assisting thrusts produced by the two motors and in their operating speeds.

However, by providing a common gear mechanism for the output shafts of the two motors and connecting them to a rack shaft by this gear mechanism, the rack shaft can be actuated with these differences between the two motors being absorbed. At this time, the difference between the produced torques and speeds of the two motors are balanced by the output of the motor with the higher output being reduced.

In this case, when the degree of the variation between the two motors of the combination is large, the consequent fall in the motor output is large, and the problem arises of the motor output being insufficient even when a preset motor control signal is applied to the motors from the control unit. In particular, when during vehicle travel the steering wheel starts to be turned or is returning to its center position, deterioration of steering feel and deterioration of controllability caused by motor output insufficiency is unavoidable. Because many large vehicles requiring large motor outputs are high-price vehicles, it is important that deficiency of steering feel caused by variation between the two motors in the electric power steering apparatus is eliminated.

Also, there is a risk of it happening that in the neutral vicinity, where the direction of rotation of the motors changes, and when the steering wheel is returning to its central position, due to variations of the motor control/driving parts the rotation of one of the motors momentarily becomes opposite, and the assisting thrusts of the two motors momentarily become opposed and cancel each other out, and responsiveness deteriorates.

Accordingly, in steering apparatus such as electric power steering apparatus having two motors, a motor driving method for a steering apparatus which obtains a balance in the operation of the two motors and of the control/driving part for each motor and which improves steering feel and raises controllability and also provides good responsiveness at all times has been awaited.

Also, when two assisting motors are provided in an electric power steering apparatus as described above, even when one of the motors fails, by means of the other motor it is possible to reduce the manual steering force required from the driver to below what it would be if there were no assisting force from a motor whatsoever. However, the size of the auxiliary steering force from the normal motor, which has not failed, is the still same as it is when the two motors are both operating normally, and to perform the same steering as when the two motors are operating normally the manual steering force load on the driver is larger. When the vehicle is stationary and the steering load is large, with one motor the burden on the driver may be great. In particular, in a heavy vehicle, because the thrust of the steering gearbox is large, the burden on the driver is large.

Reference is now made to the chart of FIG. 22 showing a relationship between the loads on the motors and the driver in a conventional electric power steering apparatus.

In an electric power steering apparatus, the ratio of the auxiliary steering force provided by the motor and the steering force applied by the driver is about 10:1. In particular, in the case of an electric power steering apparatus having two motors, the ratio of the auxiliary steering forces provided by the two motors to the steering force applied by the driver is about 5:5:1.

When the two motors, motor A and motor B, are operating normally, the burden on the driver is small, as shown by the hatching in the graph on the left side of the figure.

If motor A fails, because the auxiliary steering force becomes only that provided by motor B, the burden on the driver increases by the amount of the auxiliary steering force normally provided by motor A. That is, the load ratio of motor A to motor B to the driver becomes 0:5:6. Consequently, as shown by the case of motor A failure in the graph on the right side of the figure, the burden on the driver includes the auxiliary steering force that should be provided by motor A. This is because the size of the auxiliary steering force provided by motor B is the same as it is when motor A and motor B are both operating normally.

With respect to the normal motor, because a limit value of the current to be passed through the motor is set in accordance with the characteristics and durability and so on of the motor, and a current greater than this current limit value cannot be passed through the motor, a larger auxiliary steering force cannot be provided, and the additional load must be taken on by the driver.

When, in an electric power steering apparatus having a plurality of motors, at least one of the motors has failed like this, it is desirable for the amount of auxiliary steering force allocated to the normal motor to be increased, to reduce the burden on the driver.

Also, when an electric power steering apparatus is constructed using two motors, the kinds of problem described below arise; however, first, problems of electric power steering apparatus having a single motor will be considered.

Normally, in an electric power steering apparatus having one motor, the output shaft of the motor is connected to the steering system by way of a gear mechanism, which is a power transmission mechanism. This gear mechanism may have any of various forms. A typical one is the pinion assist type electric power steering apparatus, which has a speed reducer provided on a pinion gear shaft and a motor with its output shaft connected to this speed reducer. With a pinion assist type electric power steering apparatus, in a rack-and-pinion gearbox made up of a rack shaft having a rack gear and a pinion gear driving this provided on a steering wheel shaft, a motor and a speed reducer are provided serving the pinion gear. The pinion gear is driven by the motor via the speed reducer. By this means, steering force assistance of the steering system corresponding to the steering force is carried out.

In this electric power steering apparatus having a single motor, with the gear mechanism made up of a pinion gear and a rack gear, if the torque ripple of the motor is large, this torque ripple passes through the gear mechanism and manifests as vibration in the steering system and spoils the steering feel, and also the operating noise of the motor increases. Consequently, the product quality of a vehicle equipped with this electric power steering apparatus decreases.

In the case of a pinion assist electric power steering apparatus having two motors as steering system assisting motors, because each of the two motors is connected to the steering system by way of the rack-and-pinion mechanism described above and each of the two motors imparts a vibration caused by motor torque ripple to the steering system through this gear mechanism, the above-mentioned impairment of steering feel and motor operation noise become still more marked. This is a problem which arises generally in steering apparatus having two motors. Also, the problem arises with both brushless motors and motors with brushes.

Consequently, in steering apparatus such as electric power steering apparatus having two motors on a steering system, there has been a need to suppress motor torque fluctuation caused by torque ripple arising in each motor and thereby to reduce vibration in the steering system, improve steering feel, and raise controllability.

SUMMARY OF THE INVENTION

According to a first aspect of the present invention, there is provided a motor driving method for a steering apparatus, which comprises a step of providing two motors for applying an auxiliary steering force to a steering system; a step of, when the two motors are to be operated, operating one of the two motors first; and a step of, after the first motor is operated, operating the other motor.

In this motor driving method, for example in an electric power steering apparatus, at the initial stage when the driver starts to turn the steering wheel, that is, in the range where the auxiliary steering force (assisting thrust) from the steering force assisting motors is small, just one of the two motors is started, and steering is carried out with one motor only. Because in the low torque range at the start of steering a sufficient steering force can be obtained with only one motor, the two motors are not started simultaneously. With this construction, the occurrence of torque fluctuation caused by time differences of control commencement arising as a result of the two motors being started simultaneously is eliminated. As a result, smooth control is made possible.

Desirably, in the step of starting one of the motors first, the two motors are used alternately. With this method, because the two motors and the control/driving parts for the motors are operated at the start of turning alternately, the motors can be operated equal numbers of times.

Preferably, in the step of operating one of the motors first, the same one of the two motors is operated. Specifically, for example when the steering direction is one direction, one of the motors is operated first and then the other is operated, and when the steering direction is the other direction, the other motor is operated first and then the first motor is operated. That is, by making the motor for starting turning the same one motor at all times, a difference is established between the numbers of times the two motors are operated, and the probability of both of the motors failing in quick succession is reduced.

Desirably, the output capacities of the two motors (motor sizes and output characteristics) are made different. With this method, for example by changing the sizes of the two mounted assisting motors, it is possible to carry out control optimized in correspondence with the object of the control, such as to when torque is necessary and to when responsiveness is necessary.

Preferably, when only one of the two motors is operating, motor failure detection is carried out. That is, by employing a motor driving method wherein the start timing of the two motors is made different, a difference in the motor operating states is provided, and it becomes possible to detect which of the motors has failed from the steering state during steering.

According to a second aspect of the present invention, there is provided an electric power steering apparatus for use in a vehicle, which comprises a plurality of motors for applying a force in a direction in which a steering wheel is turned, and allocating means for allocating an auxiliary steering force among the motors, the allocating means having current allocation determining means for, when at least one of the motors has failed, increasing the allocation of auxiliary steering force allocated to the normal motors.

In this electric power steering apparatus, when at least one of the plurality of motors has failed, because a current allocation determining part of an allocating part increases the allocation of auxiliary steering force allocated to the normal motor or motors, the burden on the driver is reduced.

Preferably, the auxiliary steering force corresponds to the motor currents allocated to the motors, and the allocating means also has current limit value setting means for setting a current limit value for each of the motors, and when at least one of the motors has failed, the current limit value setting means sets the current limit value of the normal motors to failure current limit values and the allocating means allocates the motor currents in correspondence with the failure current limit values by way of the current allocation determining means, to which the failure current limit values are inputted. That is, when at least one of the motors has failed, a current limit value setting part sets the current limit values of the normal motors to failure current limit values, and in correspondence with the failure current limit values a current allocation determining part of the allocating part allocates motor currents greater than the normal current limit values so as to make maximal use of the capabilities of the normal motors, whereby the auxiliary steering force is increased and the burden on the driver is reduced.

Desirably, timing means for detecting whether the state of the current value of a normal motor being higher than its normal current limit value has continued for a predetermined time is provided, and, when it has, the current limit value setting means returns the current limit value from the failure current limit value to the normal current limit value. That is, because, under the condition that the state of the current value of a normal motor being greater than the normal current limit value has continued for a predetermined time, the current limit value setting part returns the current limit value from the failure current limit value to the normal current limit value, the normal motor can be used maximally in accordance with the durability of the normal motor, and the burden on the driver can be reduced.

According to a third aspect of the present invention, there is provided a steering apparatus wherein a driving force from a motor is transmitted through a gear mechanism to a rack shaft of a steering system and the driving force is applied in the direction of steering of a steering road wheels, having a first motor and a second motor and characterized in that in the transmission of the driving forces from the respective output shafts of the first and second motors to the rack shaft the phase of the two motors is essentially staggered by 180°.

With this steering apparatus, steering is carried out using two motors having the same capabilities, and by the electrical phases of the two motors being staggered by 180°, even when torque fluctuations arise due to torque ripple in the motors, at the rack shaft having the steering road wheels at its ends these torque fluctuations are opposite in phase and cancel each other out, and overall motor torque fluctuation can be suppressed.

Preferably, the gear mechanism is a rack-and-pinion gear mechanism, and in the meshing relationship between two pinion gears connected to the output shafts of the two motors and rack gears corresponding to these, the phases of the pinion gears are essentially staggered by 180°. By staggering the phases of the pinion gears by 180° in this way, the torque fluctuations transmitted from the pinion gears to the rack gears are made opposite in phase, and mutual cancellation occurs and motor torque fluctuation can be suppressed.

In a preferred form, between the two motors, the waveform of the motor torque fluctuation arising from one of the motors and the waveform of the motor torque fluctuation arising from the other motor are set so as to be opposite in phase. That is, in the respective driving force transmission linkages of the two motors in the two-motor steering apparatus, if setting is so carried out that the waveforms of the motor torque fluctuations arising in the transmission linkages are opposite in phase, the motor torque fluctuations can be suppressed.

Preferably, the two motors used in this steering apparatus of the invention are used as electric power steering assisting motors for supplementing a manual steering force. In an electric power steering apparatus using two motors like this, if torque fluctuations caused by torque ripple of the motors is suppressed, vibration in the steering system of the electric power steering apparatus can be reduced and the steering feel improved.

BRIEF DESCRIPTION OF THE DRAWINGS

Certain preferred embodiments of the present invention will now be described in detail, by way of example only, with reference to the accompanying drawings, in which:

FIGS. 21A through 21C are views showing changes of motor torque fluctuations produced by the two rack-and-pinion mechanisms shown in FIG. 20, FIGS. 21A and 21B showing torque fluctuations of the two motors, and FIG. 21C showing a torque fluctuation obtained by combining the torque fluctuations of the two motors.

DETAILED DESCRIPTION OF THE PREFERRED EMBODIMENTS

Figure 1:
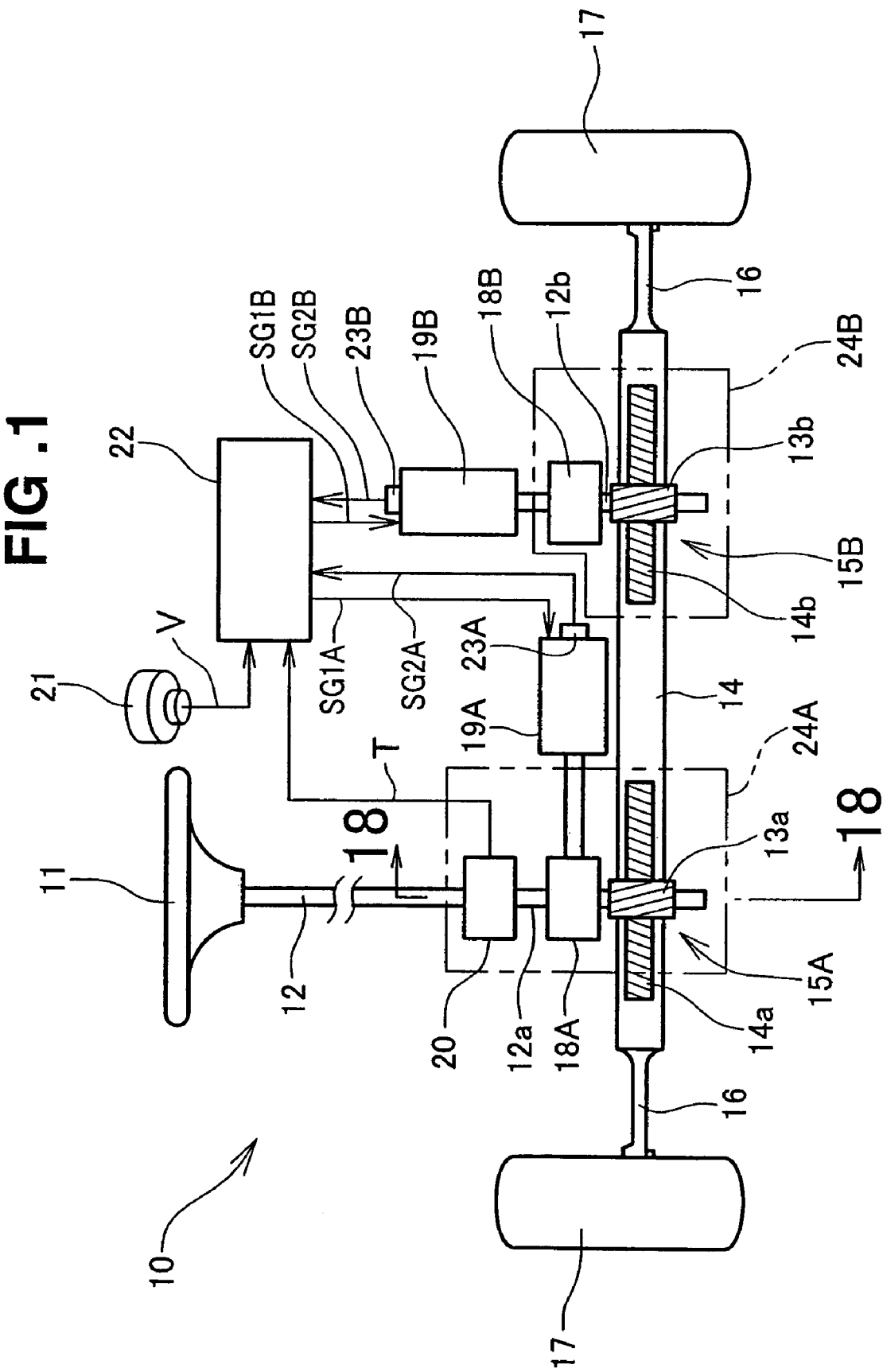
FIG. 1 is a construction view showing schematically the overall construction of an electric power steering apparatus to which a motor driving method according to the invention has been applied.
Figure 2:
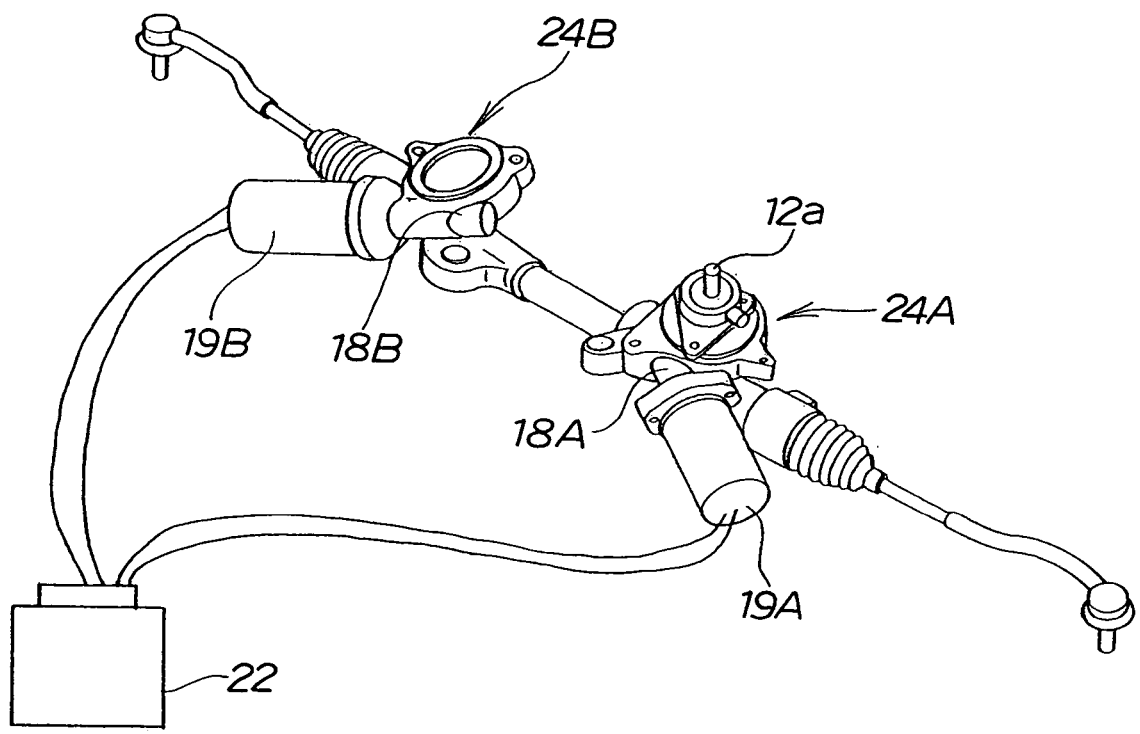
FIG. 2 is a view showing the external layout of an actual apparatus of a rack shaft having two motors and a gear box.

Referring to FIG. 1 and FIG. 2, an electric power steering apparatus 10 is mounted in a passenger vehicle or a large passenger vehicle. The electric power steering apparatus 10 is constructed to apply an assisting steering torque to a steering shaft 12 connected to a steering wheel 11. The upper end of the steering shaft 12 is connected to the steering wheel 11, and a first pinion gear (or pinion) 13a is attached to the lower end.

Part of the lower end of the steering shaft 12 to which the first pinion gear 13a is attached will be called the first pinion shaft 12a. In practice, the upper side of the steering shaft 12 and the first pinion shaft 12a on the lower side are connected by a universal joint not shown in the figure.

A rack shaft 14 has two rack gears, a first rack gear 14a and a second rack gear 14b, formed apart from each other in the length direction of the shaft.

The first pinion gear 13a and the first rack gear 14a form a first rack-and-pinion mechanism 15A.

The first rack-and-pinion mechanism 15A, a first power transmission mechanism 18A and a steering torque detecting part 20 are housed in a first gearbox 24A. The exterior of the first gearbox 24A is shown in FIG. 2.

The rack shaft 14 has tie rods 16, 16 at its ends. Front wheels 17, 17 functioning as steering road wheels of the vehicle are attached to outer ends of the tie rods 16, 16.

The electric power steering apparatus 10 of this preferred embodiment has two motors, a first motor 19A and a second motor 19B. The first motor 19A is connected by way of the first power transmission mechanism 18A to the first pinion shaft 12a. The second motor 19B is connected by way of a second power transmission mechanism 18B to a second pinion shaft 12b. These first and second motors 19A, 19B are each operated independently with design details (output capacity and so on), proper start timing, and operating details determined independently for each, as will be further discussed later, and output turning forces (torques) for supplementing a steering torque, and these turning forces are applied by way of the first and second power transmission mechanisms 18A, 18B to the first and second pinion shafts 12a, 12b.

The steering torque detecting part 20 is provided on the steering shaft 12. When a steering torque created by the driver turning the steering wheel 11 is applied to the steering shaft 12, this steering torque detecting part 20 detects the steering torque acting on the steering shaft 12.

The reference number 21 denotes a vehicle speed detecting part for detecting the speed of the vehicle. A control unit (ECU) 22 is made up of a computer system using a microcomputer.

The control unit 22 takes in a steering torque signal T outputted from the steering torque detecting part 20 and a vehicle speed signal V outputted from the vehicle speed detecting part 21, and, on the basis of information pertaining to the steering torque and information pertaining to the vehicle speed, outputs drive control signals SG1A, SG1B for controlling the operation of the first and second motors 19A, 19B. The first and second motors 19A, 19B have first and second motor angle detecting parts 23A, 23B. Signals SG2A, SG2B pertaining to the angular positions (electrical angles) of the first and second motor angle detecting parts 23A, 23B are inputted to the control unit 22.

The first motor 19A and the second motor 19B used in this embodiment have identical constructions and capabilities.

As shown in FIG. 1 and FIG. 2, a second gearbox 24B houses the second rack gear 14b formed on the rack shaft 14; a second pinion gear 13b meshing with this second rack gear 14b; the second pinion shaft 12b, which is rotatably supported and to which the second pinion gear 13b is attached; and the second power transmission mechanism 18B. The output shaft of the second motor 19B has a transmission shaft (worm shaft). This transmission shaft has a worm gear. A worm wheel meshing with this worm gear is fixed to the second pinion shaft 12b. Thus the second gearbox 24B has basically the same construction as the first gearbox 24A.

When the second motor 19B is driven, driving force is transmitted through the output shaft, the worm gear, the worm wheel, the second pinion shaft 12b, the second pinion gear 13b and the second rack gear 14b to the rack shaft 14.

As described above, the electric power steering apparatus 10 of this preferred embodiment has a steering torque detecting part 20, a vehicle speed detecting part 21, a control unit 22, two motors 19A, 19B, and two power transmission mechanisms 18A, 18B.

In this construction, when the driver turns the steering wheel 11 to steer the car while driving, a turning force based on the steering torque applied to the steering shaft 12 is converted through the first pinion shaft 12a at the bottom of the steering shaft 12 and the first rack-and-pinion mechanism 15A to linear motion in the axial direction of the rack shaft 14, and then through the tie rods 16, 16 it changes the travel direction of the front wheels 17, 17.

At this time, the steering torque detecting part 20 provided on the steering shaft 12 simultaneously converts a steering torque corresponding to the steering force applied to the steering wheel 11 by the driver into an electrical steering torque signal T, and outputs this steering torque signal T to the control unit 22. The vehicle speed detecting part 21 detects the speed of the vehicle and converts this to a vehicle speed signal V, and outputs this vehicle speed signal V to the control unit 22. The control unit 22 generates motor currents for driving the two motors 19A, 19B on the basis of the steering torque signal T and the vehicle speed signal V. The first and second motors 19A, 19B driven by these motor currents apply auxiliary steering torques to the rack shaft 14 by way of the first and second power transmission mechanisms 18A, 18B. As described above, by the two motors 19A, 19B being operated on the basis of a predetermined motor driving method, the steering force applied to the steering wheel 11 by the driver is reduced.

Figure 3:
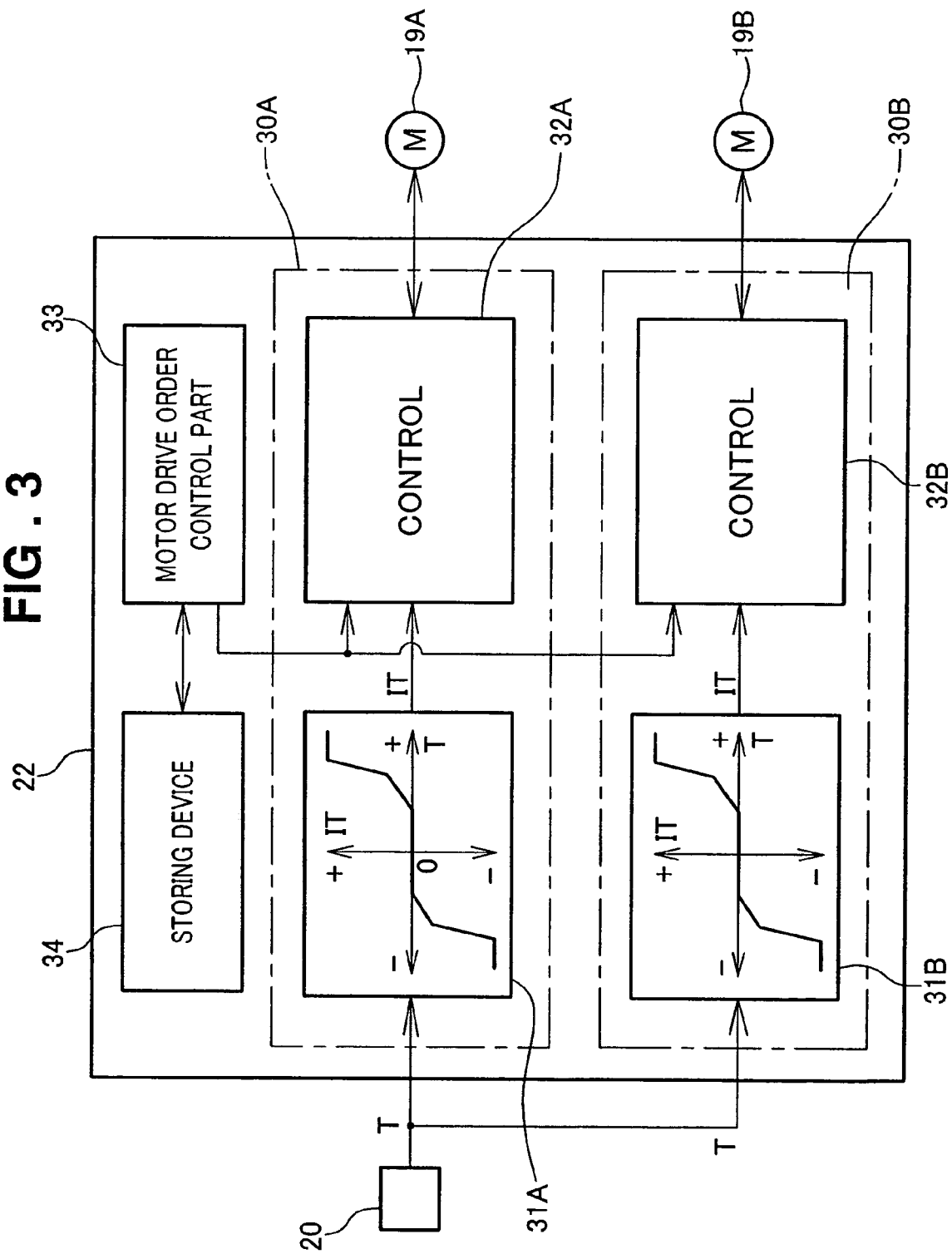
FIG. 3 is a block diagram showing part of the internal construction of a control unit according to a first preferred embodiment of the invention.

As shown in FIG. 3, the control unit 22 has a first motor control part 30A and a second motor control part 30B provided in parallel, for drive-controlling the first motor 19A and the second motor 19B on the basis of the steering torque information outputted from the steering torque detecting part 20. The control unit 22 also has a motor drive order control part 33 for controlling the drive order of the two drive motors 19A, 19B, and a storing device 34 storing a program for executing this drive sequencing of the two motors.

The motor drive order control part 33 is a higher-level control part than the first and second first motor control parts 30A, 30B, and is constructed around a CPU.

The first motor control part 30A and the second motor control part 30B have essentially the same construction and function, and respectively have target current determining parts 31A, 31B and control parts 32A, 32B. The target current determining parts 31A, 31B determine target auxiliary torques mainly on the basis of the steering torque signal T, and output signals (target current signals) IT pertaining to target current values necessary for supplying these target auxiliary torques from the first and second motors 19A, 19B. The T-IT conversion characteristic shown in FIG. 3 is an example.

Next, a specific example of the control part 32A in the first motor control part 30A will be described, on the basis of FIG. 4. Here, because the second motor control part 30B is the same as the first motor control part 30A, a description of the control part 32B will be omitted.

Figure 4:
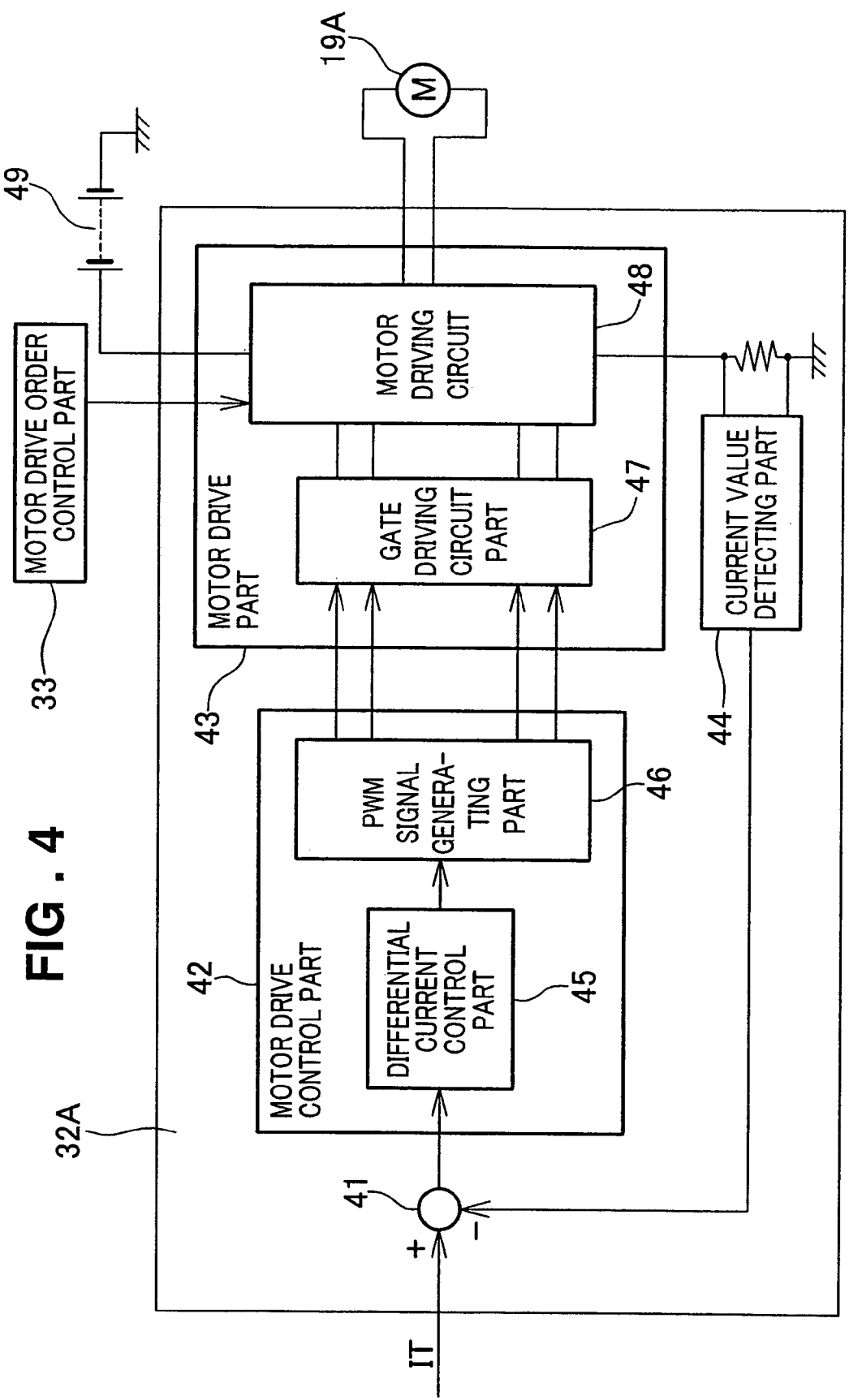
FIG. 4 is an electrical function block diagram showing the internal construction of a motor control part shown in FIG. 3.

As shown in FIG. 4, the control part 32A is made up of a differential operator part 41, a motor drive control part 42, a motor driving part 43 and a current value detecting part 44.

The motor drive control part 42 is made up of a differential current control part 45 and a PWM signal generating part 46.

The differential current control part 45 generates and outputs a driving current signal for controlling the motor current on the basis of the current signal from the differential operator part 41.

The PWM signal generating part 46 generates a PWM (Pulse Width Modulation) signal for PWM-driving the first motor 19A on the basis of the driving current signal from the differential current control part 45.

The motor driving part 43 is made up of a gate driving circuit part 47 and a motor driving circuit (an H-type bridge circuit formed with four FETS) 48. The gate driving circuit part 47 switches the motor driving circuit 48 on the basis of the drive-control signal (PWM signal).

By this means, the first motor control part 30A shown in FIG. 3 PWM-controls the motor current supplied to the first motor 19A from a battery power source 49 on the basis of the steering torque T detected by the steering torque detecting part 20, and controls the power outputted by the first motor 19A (the auxiliary steering torque).

The following control is carried out in connection with the order of operation of the two motors 19A, 19B controlled by the control unit 22 having this construction. This operation order control is carried out by the motor drive order control part 33, which is the high-level control part shown in FIG. 3.

First, a motor driving method of a first example pertaining to the first preferred embodiment will be described, with reference to FIG. 5. This motor driving method is applied in the range where the assisting thrust of the electric power steering apparatus 10 is small (start of steering; low torque range), when the steering wheel 11 is starting to turn. In this motor driving method, at the start of steering, steering force supplementation is carried out with only one of the two motors 19A, 19B. And with the motor driving method of this first example, the ratings and output characteristics of the two motors 19A, 19B are the same.

Figure 5:
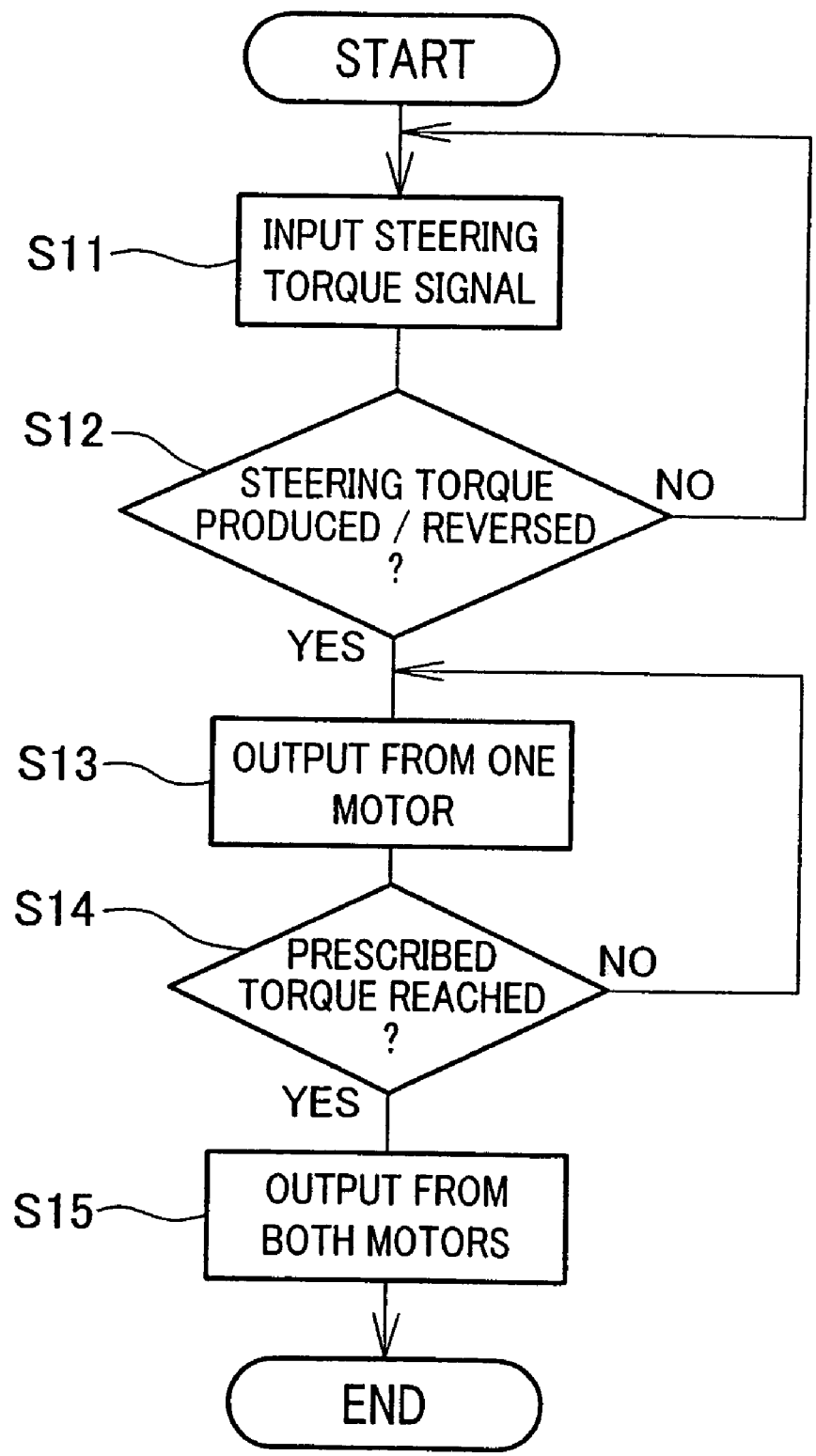
FIG. 5 is a flowchart showing a motor driving method of a first example pertaining to the first preferred embodiment.

In FIG. 5, when the driver operates the steering wheel 11 shown in FIG. 1 to start turning or to return it, a signal pertaining to the steering torque of this steering state detected by the steering torque detecting part 20 is inputted to the control unit 22. In the control unit 22, the detection signal from the steering torque detecting part 20 is inputted (step S11), and it is determined whether or not there has been an application of steering torque or a reversal of steering torque corresponding to this steering state (step S12). When in step S12 the determination is NO, steps S11, S12 are repeated. When in step S12 the determination is YES, the following step S13 is executed.

In step S13, one of the two motors 19A, 19B (for example the first motor 19A) is started, and an assisting thrust is outputted.

In step S14, until it is determined that the assisting thrust from the motor 19A has reached its rated torque, the operation of the first motor 19A is continued. As the signal for determining whether or not the rated torque has been reached, the above-mentioned steering torque signal T may be used, or alternatively a torque signal detectable from the first motor 19A can be used. Steps S13 and S14 are repeated until the rated torque is reached. When in step S14 it is determined that the assisting thrust from the first motor 19A has reached the rated torque, processing proceeds to step S15.

In step S15, of the two motors 19A, 19B, the operation of the motor already operating is continued, and the other motor (in this case, the second motor 19B) is started and an assisting thrust is outputted from that. Accordingly, when step S15 is executed, assisting thrusts outputted by the two motors 19A, 19B are applied to the steering system.

With this first motor driving method, because in the low torque range only one of the two motors 19A, 19B is operated to provide steering force supplementation, torque fluctuation of a control commencement time difference resulting from the two motors being started at the same time does not arise, and smooth assisting can be effected at the start of turning or returning. And after the rated torque has been reached, the two motors 19A, 19B are operated simultaneously to output a large assisting thrust.

Also, because the start timings of the two motors 19A, 19B are staggered in correspondence with the assisting thrust required, the output drop caused by torque interference of when the variation between the two motors is large can be eliminated, and control which is stable with respect to output can be carried out. In particular, at low assisting thrusts, such as at the start of turning or returning during travel, when torque fluctuations can be felt easily, control having little torque fluctuation can be carried out.

Although in the motor driving method of the first example described above it was determined in step S14 whether or not a rated torque had been reached, instead of determining on the basis of torque it is possible alternatively to provide a step of determining whether or not a rated duty has been reached. With this method, the determination can be made with reference to the state of duty of the above-mentioned PWM signal determining the motor current supplied to the motor. In this way the prescribed value in step S14 can be changed.

Next, a motor driving method of a second example will be described, on the basis of FIG. 6. In this motor driving method, the two motors 19A, 19B are used alternately as the motor used at the start of steering when the steering wheel 11 starts to be turned. By this means, the frequencies of operation of the two motors 19A, 19B can be made the same. In the motor driving method of this second example, the ratings and output characteristics of the two motors 19A, 19B are the same.

Figure 6:
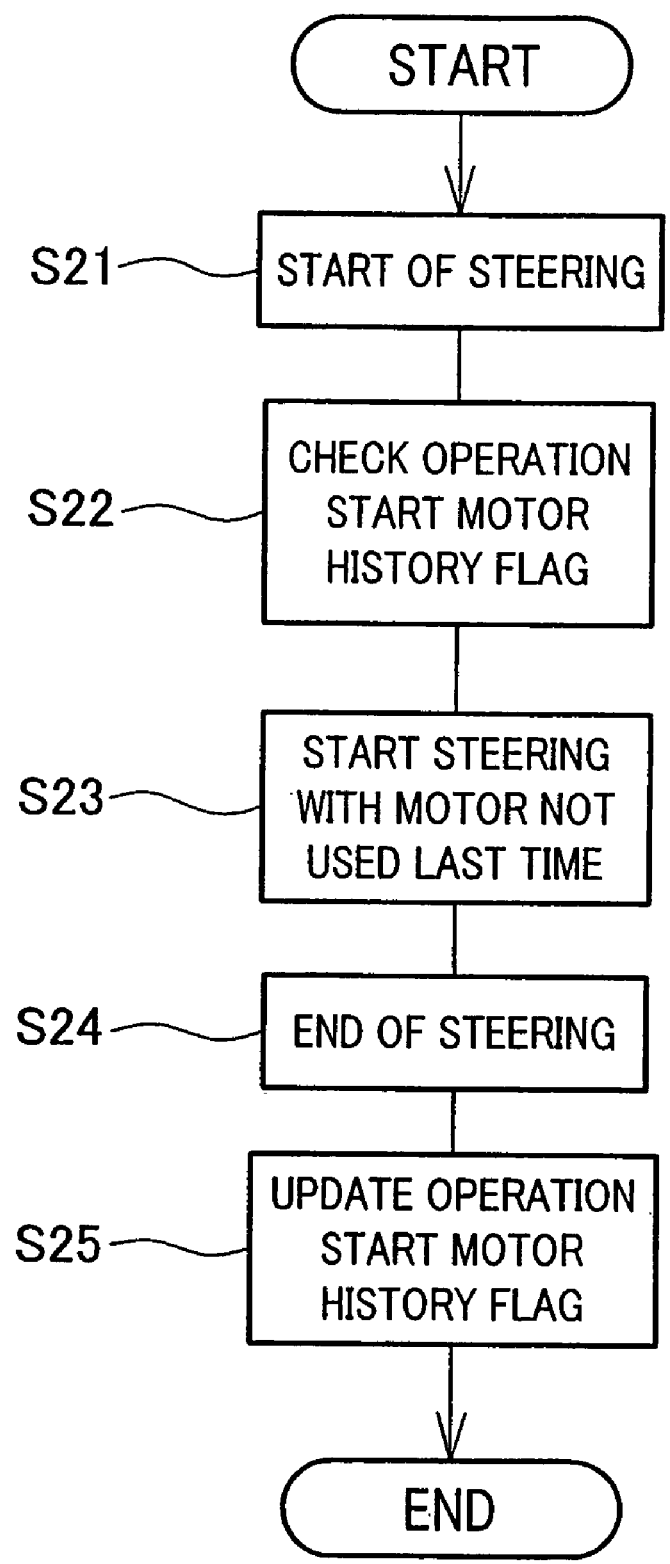
FIG. 6 is a flowchart showing a motor driving method of a second example pertaining to the first preferred embodiment.

The control procedure of the motor driving shown in FIG. 6, from the point of view of the motor driving method as a whole, is inserted between the steps S12 and S14 shown in FIG. 5. When a predetermined steering torque state has been detected (step S12) and one of the two motors 19A, 19B is to be started, steps S21 through S25 shown in FIG. 6 are executed to determine which of the motors should be started first in the step S13 shown in FIG. 5.

With this second motor driving method example, in step S21, with the premise that an assisting thrust is to be produced, steering commencement processing is executed. After that, an operation start motor history flag is checked (step S22). Here, the state of an operation history flag of the two motors 19A, 19B is checked.

In the following step S23 the motor which was not used the previous time is selected, and steering commencement of this motor is executed. As a result, the step S13 shown in FIG. 5 is implemented. The subsequent steps S24, S25 are post-processing steps. That is, under the condition that steering has ended (step S24), the history flag pertaining to the motor that was started first at the start of steering is updated (step S25).

With the motor driving method of this second example, as the motor started at the start of steering, the two motors 19A, 19B are used alternately, and the frequencies of operation of the two motors are thereby made equal. As a result, equal loads can be applied to the two motors 19A, 19B and the control/driving parts of the motors, and their lives can be equalized.

A motor driving method of a third example will now be described, with reference to the flowchart shown in FIG. 7. This motor driving method is a variation of the motor driving methods of the first and second examples. In this motor driving method, regarding the motor to be used at the start of steering when the steering wheel 11 is starting to turn, one of the two motors 19A, 19B is allocated to rightward use only and the other is allocated to leftward use only. Because rightward steering and leftward steering occur in substantially the same proportions during travel, by this means the frequencies of operation of the two motors 19A, 19B can be made equal. With this third motor driving method example, the ratings and output characteristics of the two motors 19A, 19B are the same. In the control procedure of FIG. 7, steps the same as steps shown in FIG. 6 have been given the same reference numerals.

Figure 7:
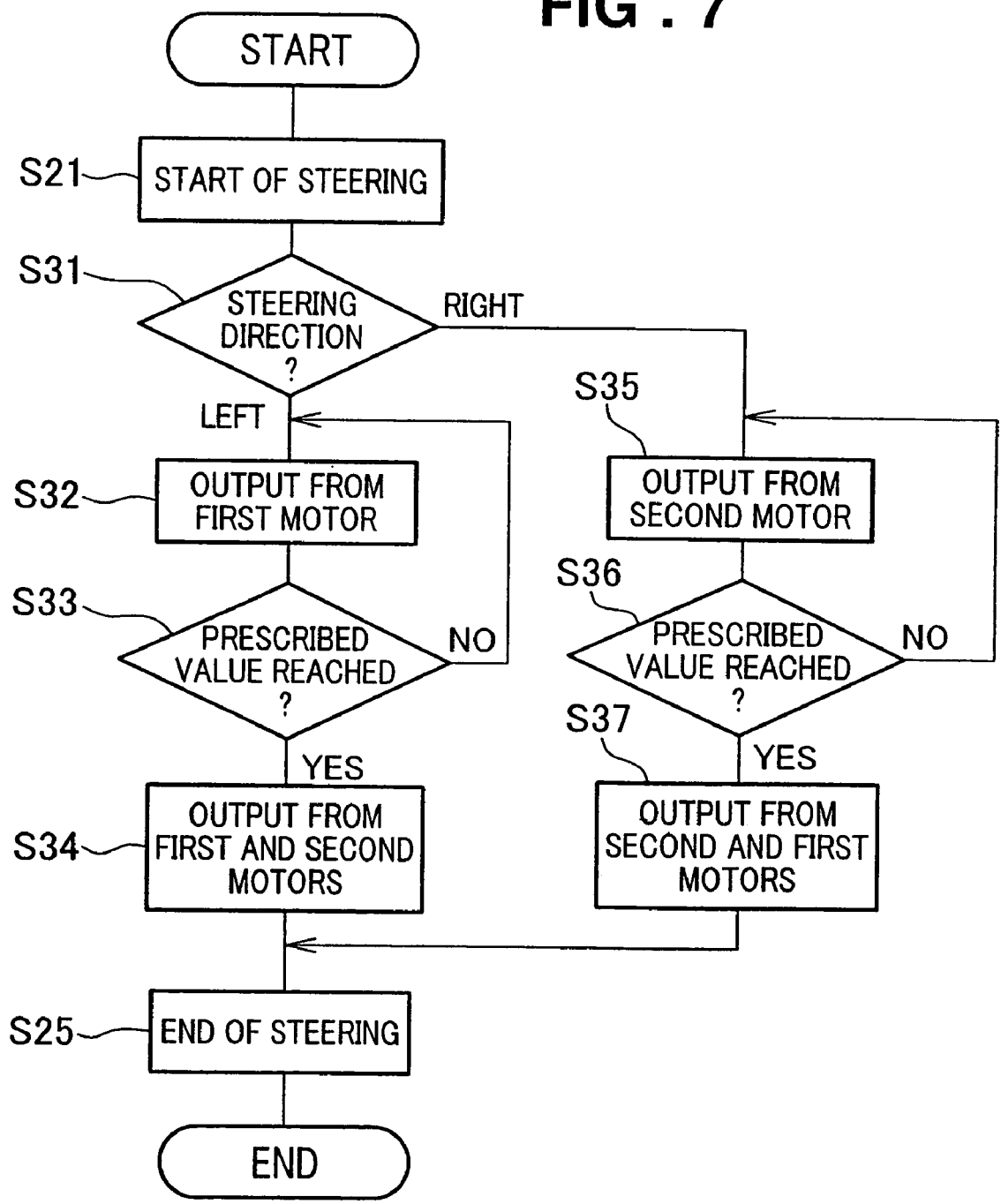
FIG. 7 is a flowchart showing a motor driving method of a third example pertaining to the first preferred embodiment.

In the flowchart shown in FIG. 7, after the steering commencement processing step S21, a steering direction distinguishing step S31 follows. When in step S31 the steering direction is determined to be leftward, the three steps S32, S33, S34 are carried out. These steps S32 to S34 are essentially the same respectively as the steps S13 to S15 shown in FIG. 4. When in step S31 the steering direction is determined to be rightward, the three steps S35, S36 and S37 are executed. These steps S35 to S37 are essentially the same respectively as the steps S13 to S15 shown in FIG. 5. Finally, steering ending processing S25 is carried out.

With this third motor driving method example, by the two motors 19A, 19B being allocated to either rightward use or leftward use and each used at the start of steering accordingly, the frequencies of operation of the two motors can be made equal and their lives made equal.

A motor driving method of a fourth example will now be described, on the basis of the flowchart shown in FIG. 8. This motor driving method is a variation of the motor driving method of the first example. In this motor driving method, the two motors 19A, 19B are designated as a main motor and a sub motor, and it is predetermined that the motor used at the start of steering will always be the main motor. The ratings and output characteristics of the two motors may be the same or may be different. In the flowchart shown in FIG. 8, steps essentially the same as steps shown in FIG. 5 have been given the same reference numerals.

Figure 8:
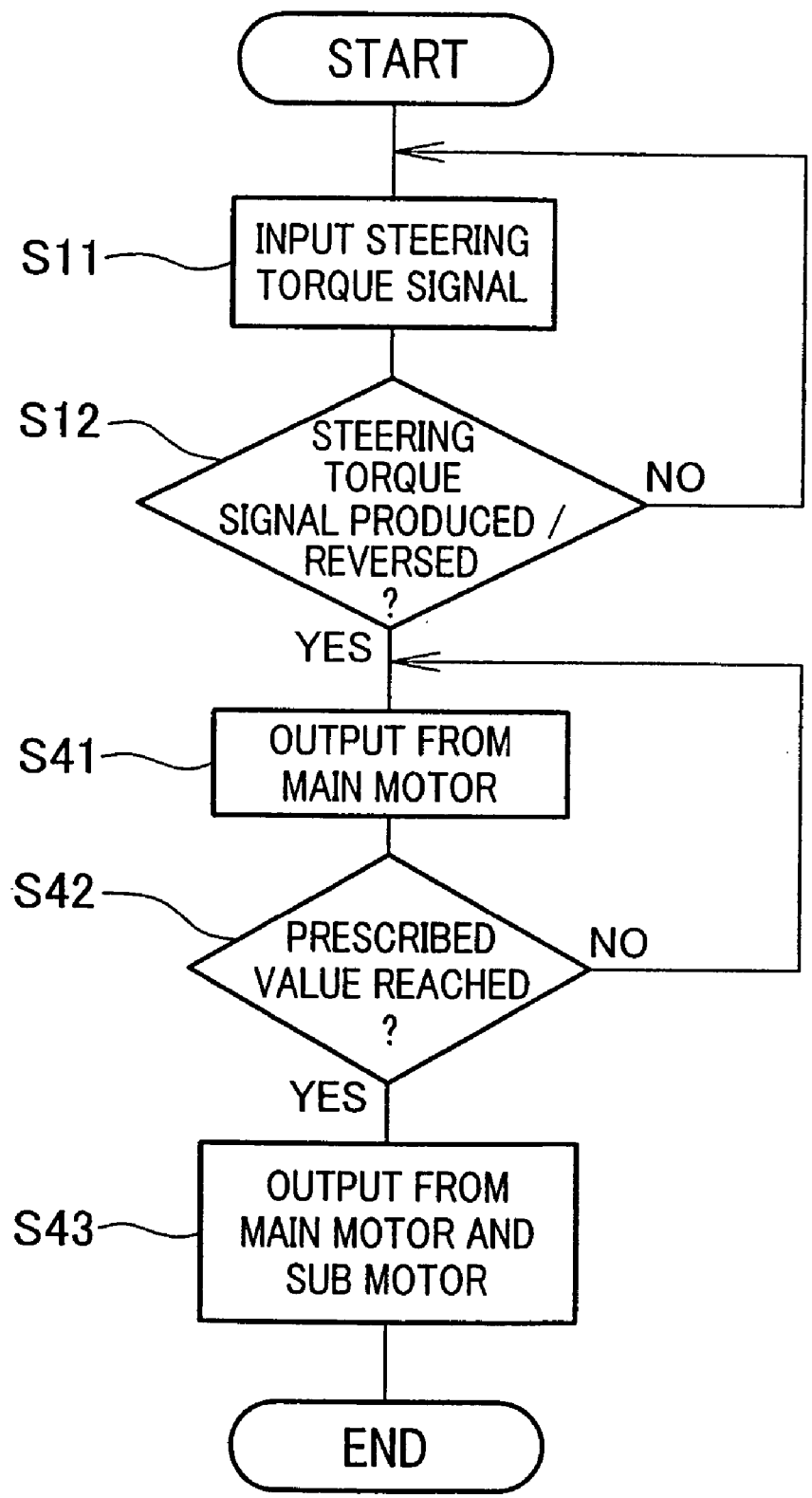
FIG. 8 is a flowchart showing a motor driving method of a fourth example pertaining to the first preferred embodiment.

In FIG. 8, when the driver starts to turn or returns the steering wheel 11, in the control unit 22, the detection signal from the steering torque detecting part 20 is inputted (step S11), and it is determined whether or not there has been an application of steering torque or a reversal of steering torque corresponding to this steering state (step S12). When in step S12 the determination is NO, steps S11, S12 are repeated. When in step S12 the determination is YES, step S41 is executed.

In step S41, whichever of the two motors 19A, 19B is the main motor is started, and an assisting thrust is outputted. In the next step, step S42, until it is determined that the assisting thrust from the main motor has reached a prescribed value (prescribed torque or prescribed duty), operation of the main motor is continued. That is, steps S41 and S42 are continued.

When in step S42 it is determined that the assisting thrust from the main motor has reached the prescribed value, processing proceeds to step S43.

In step S43, while the operation of the main motor is continued, the remaining one of the two motors 19A, 19B, i.e. the sub motor, is started and outputs an assisting thrust. Accordingly, when step S43 is executed, assisting thrusts are applied to the steering system by the two motors 19A, 19B.

With the fourth motor driving method example described above, because in the low torque range steering force supplementation is carried out with only the main motor being operated, torque fluctuation of a control commencement time difference resulting from the two motors being started at the same time does not arise, and smooth steering force supplementation can be effected at the start of turning.

Also, because the start timing of the two motors 19A, 19B is staggered in correspondence with the assisting thrust required, the output drop caused by torque interference of when the variation between the two motors is large can be eliminated, and control which is stable with respect to output can be carried out. In particular, at low assisting thrusts, such as at the start of turning or returning during travel, when torque fluctuations can be felt easily, control having little torque fluctuation can be carried out.

Also, with this fourth motor driving method example, by using a main motor of the two motors at the start of steering, the total numbers of times that the two motors are driven can be made different, and a difference can be provided in the lives of the motors. Therefore, the probability of both of the motors failing at the same time is reduced. And when one of the motors fails, by monitoring the value of the assisting torque it can be inferred which of the motors has failed. For example, when no torque is obtained at the start of steering it can be inferred that the main motor has failed, and when no torque is obtained when an assisting torque is necessary it can be inferred that the sub motor has failed.

Because it is possible to make the two motors 19A, 19B a main motor and a sub motor and differentiate the ratings and output characteristics of the motors in magnitude, it is possible to realize optimal control both when torque is necessary and when responsiveness is necessary. For example, if a motor with a large output is used at the start of turning, when a smaller motor is then driven an ample torque is already present, and as a result the relative value of the torque fluctuation of when the second motor is started can be made small, and the steering feel can be made good.

A motor driving method of a fifth example will now be described, with reference to the flowchart shown in FIG. 9. This motor driving method shows an example of a control method for when one of the motors has failed. In this case, the ratings and output characteristics of the two motors 19A, 19B may be the same or may be different.

Figure 9:
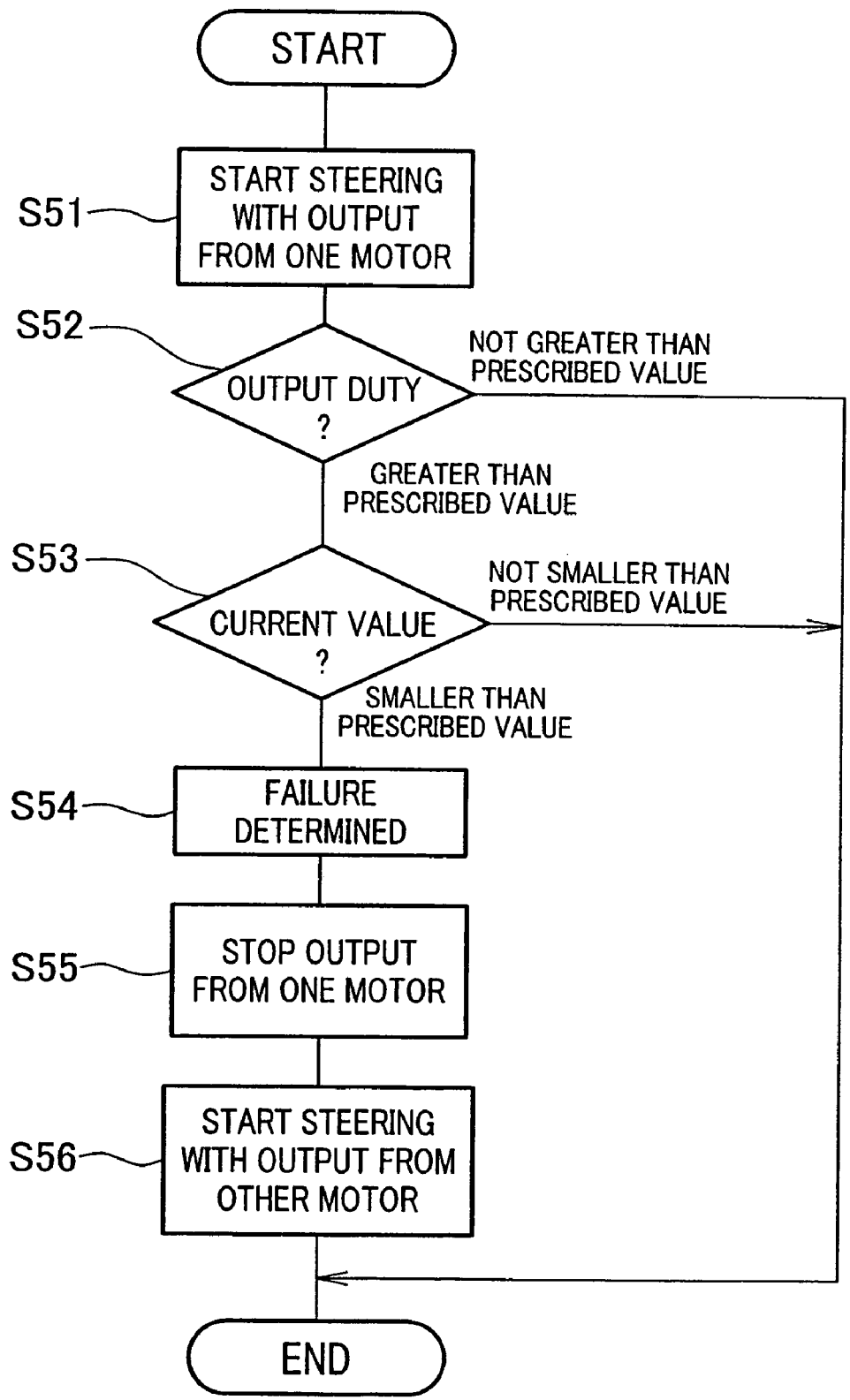
FIG. 9 is a flowchart showing a motor driving method of a fifth example pertaining to the first preferred embodiment.

Steps S51 to S56 shown in FIG. 9 correspond to processing for when one of the motors is started at the start of steering. When the steering wheel 11 is operated and steering force supplementation is carried out by the electric power steering apparatus 10, first, at the start of steering, one of the two motors is started and attempts to commence steering (step S51). At this time, the output duty of the motor that was started is determined (step S52).

When in step S52 the output duty of this motor is below a prescribed value, the operating state of this motor is continued without change. After that, as explained with reference to the flowchart of FIG. 5, it is determined whether or not a prescribed torque has been reached (step S14), and processing for starting the other motor (step S15) is carried out. When in step S52 the output duty of the first motor is larger than the prescribed value, the value of the motor current is determined (step S53).

When in step S53 the value of the motor current is above a prescribed value, because the required motor output is being obtained, the operating state of this first motor is continued without change. After that, as explained on the basis of the flowchart shown in FIG. 5, it is determined whether or not a prescribed torque has been reached (step S14), and processing for starting the other motor is carried out (step S15).

When in step S53 the value of the motor current is smaller than the prescribed value, it is determined that the first motor has failed (step S54), and the operation of this motor is stopped (step S55). After that, the other of the two motors is operated, and steering with this motor is started (step S56). In this case, steering force supplementation is carried out with this second motor only.

With this fifth motor driving method example, when one of the two motors 19A, 19B has failed, control is carried out with just the remaining motor. Compared to a construction in which two motors are operated simultaneously, failure detection is easier, and failure detection can be carried out in a short time.

In the motor driving methods of an electric power steering apparatus having two motors described above, because steering force supplementation control is carried out with one motor only, control which does not suffer an influence of reversing timing of the two motors can be achieved.

In the first preferred embodiment described above, examples of motor driving methods for an electric power steering apparatus have been described; however, a motor driving method for two motors provided in a steering system according to the invention can be applied to other steering apparatus, such as steer-by-wire systems.

As described above, with this first preferred embodiment, because in the low torque range a steering force is outputted with only one of two motors provided in a steering system, torque fluctuation resulting from control commencement time difference is eliminated and smooth control can be carried out. And because control is started with one motor only, influences of reversing timing of two motors on return can be avoided.

Also, with this preferred embodiment, because the two motors can be used alternately as the motor started first, the usage frequencies of the two motors can be kept equal and their lives can be kept equal.

Also, with this preferred embodiment, because the first motor to start first is always the same, the usage frequencies of the two motor can be different and the lives of the two motors can be different. Thus, failures of the two motors at the same time can be avoided.

Also, with this preferred embodiment, because two motors are provided and their starting timing is made different, failure detection of the motors is easy and can be effected rapidly.

Also, with this preferred embodiment, because the sizes of the two motors provided can be made different, it is possible to effect optimal control adaptable to different control objectives, such as that of when torque is necessary and that of when responsiveness is necessary.

Figure 10:
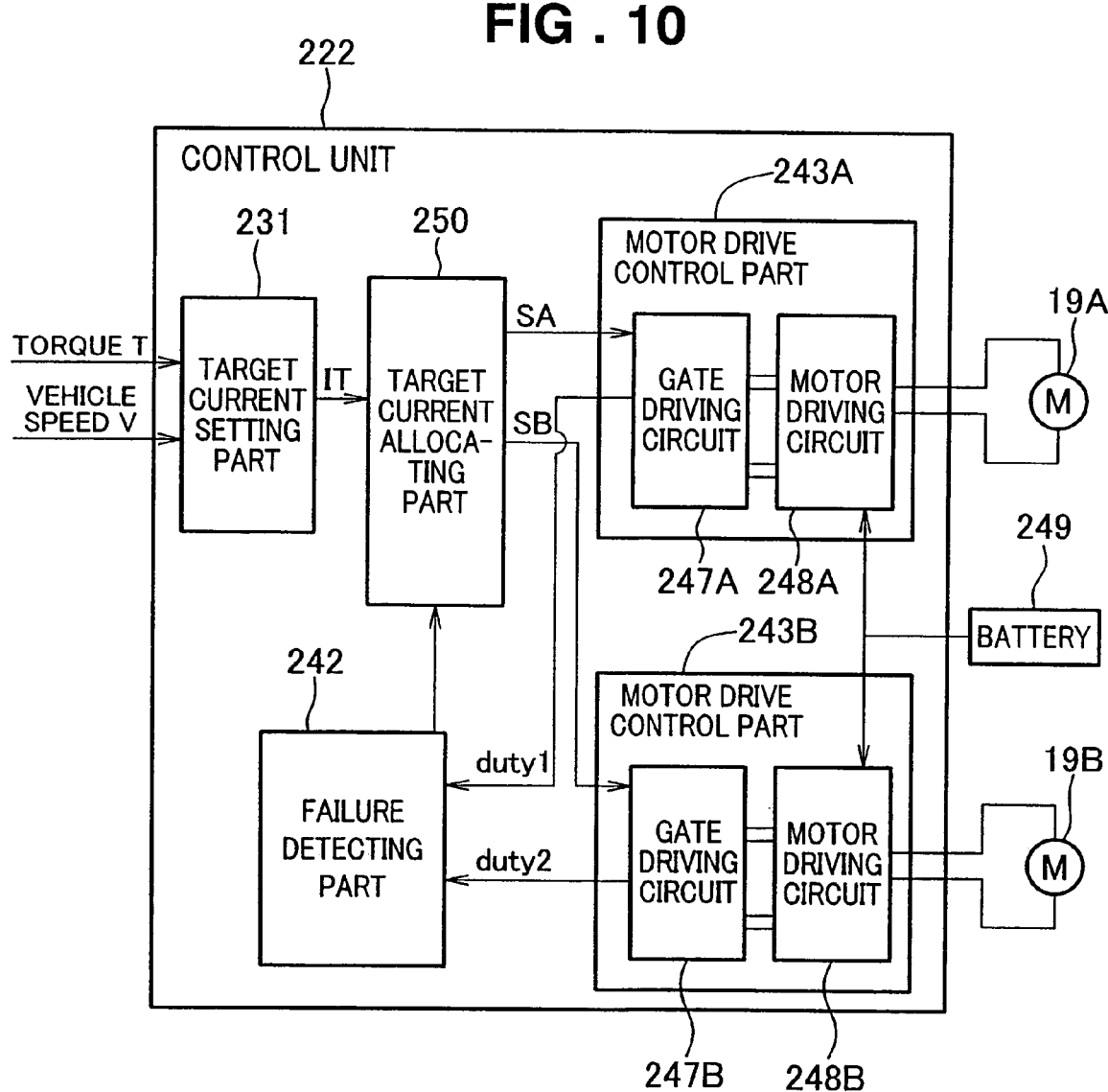
FIG. 10 is an electrical function block diagram showing the internal construction of a control unit according to a second preferred embodiment of the invention.

FIG. 10 is a block diagram showing the internal construction of a control unit 222 according to a second preferred embodiment of the invention.

The control unit 222 is made up of a motor drive control part 243A for the first motor 19A, a motor drive control part 243B for the second motor 19B, a target current setting part 231 for setting a target current on the basis of the steering torque signal T and the vehicle speed signal V and outputting a target current signal IT, a failure detecting part 242 for detecting failure of the motors 19A, 19B, and a target current allocating part 250 for allocating target currents to the motors 19A, 19B.

The motor drive control part 243A is made up of a gate driving circuit 247A and a motor driving circuit 248A. The motor drive control part 243B is made up of a gate driving circuit 247B and a motor driving circuit 248B. Power from a battery 249 is supplied to the motor driving circuits 248A, 248B.

The failure detecting part 242 detects failures for example on the basis of the duties duty 1, duty 2 of the PWM signals applied respectively to the motor driving signals 248A, 248B from the gate driving circuits 247A, 247B.

The above-mentioned motor currents are currents passed through the motors 19A, 19B from the motor drive control parts 243A, 243B. The gate driving circuit 247A of the motor drive control part 243A outputs a PWM signal on the basis a current signal SA allocated to it by the target current allocating part 250, and switches the motor driving circuit 248A on the basis of the duty of this PWM signal. By this means a motor current is supplied to the first motor 19A. Also in the motor drive control part 243B for the motor 19B, the gate driving circuit 247B and the motor driving circuit 248B operate similarly on the basis of a current signal SB allocated by the target current allocating part 250. When it receives a failure signal K from the failure detecting part 242, the target current allocating part 250 identifies the failed motor and changes the current signals SA, SB in accordance with the result so as to increase the motor current passing through the normal motor, which has not failed.

Figure 11:
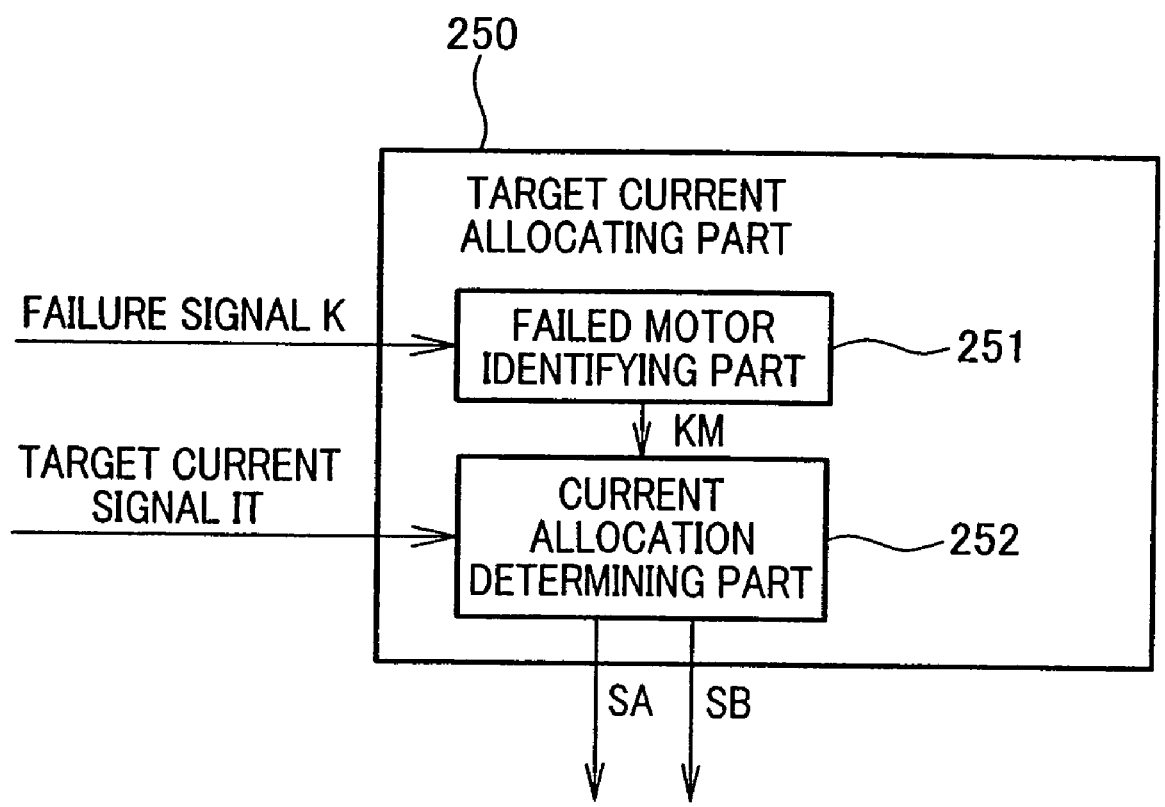
FIG. 11 is an electrical function block diagram showing a specific example of a target current allocating part shown in FIG. 10.

FIG. 11 is a block diagram showing the internal construction of the target current allocating part 250 shown in FIG. 10.

The target current allocating part 250 is made up of a failed motor identifying part 251 for receiving the failure signal K and identifying a failed motor and a current allocation determining part 252 for receiving the target current signal IT and determining currents to be allocated to the two motors 19A, 19B and outputting the current signals SA, SB. The failed motor identifying part 251 receives the failure signal K and determines whether a failed motor is the first motor 19A or the second motor 19B. The failed motor identifying part 251 outputs a signal KM pertaining to the normal motor to the current allocation determining part 252. The current allocation determining part 252 receives the target current signal IT and the signal KM pertaining to the normal motor and determines currents to be supplied to the first motor 19A and the second motor 19B. For example, when the first motor 19A has failed, it makes the current to the first motor 19A zero and increases the current to the second motor 19B.

Figure 12:
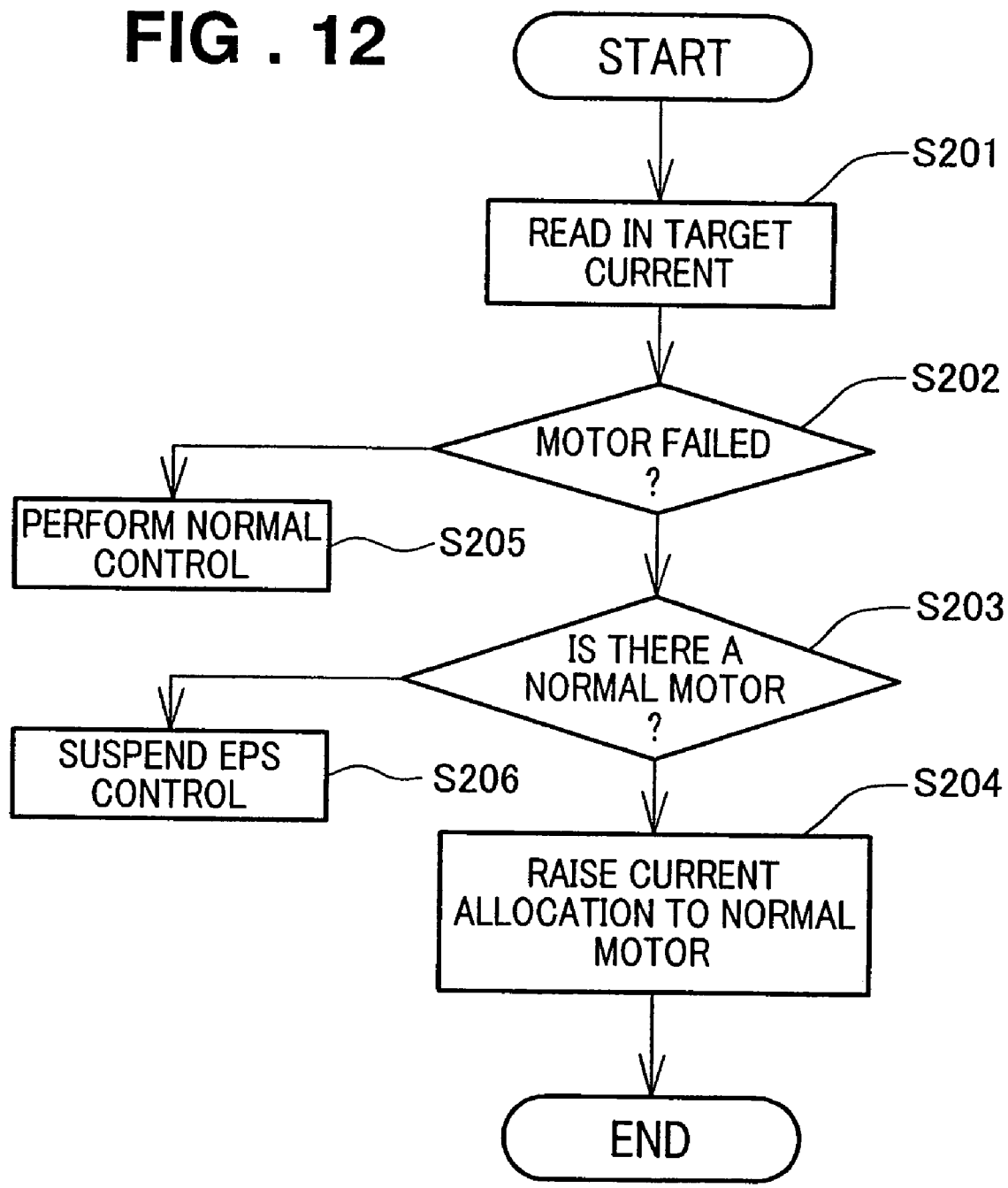
FIG. 12 is a flowchart showing the operation of the target current allocating part of the second preferred embodiment shown in FIG. 11.

Next, with further reference to FIG. 10 and FIG. 11, the operation of the control unit 222 of this second preferred embodiment will be explained on the basis of the operation flowchart for the target current allocating part 250 shown in FIG. 12.

The target current allocating part 250 reads in the target current signal IT from the target current setting part 231 shown in FIG. 10 (step ST201) and receives the failure signal K from the failure detecting part 242. The failure signal K is for example a 2-bit signal, with '00' meaning that the first and second motors 19A, 19B are both normal, '01' meaning that the first motor 19A is normal and the second motor 19B has failed, '10' meaning that the first motor 19A has failed and the second motor 19B is normal, and '11' meaning that the first and second motors 19A, 19B have both failed.

From this failure signal K it is determined whether either or both of the first and second motors 19A, 19B has failed (step S202). Here, it is determined whether or not there is a '1' in either of the bits of the 2-bit signal. When there is no failed motor, i.e. when the two motors are both working normally, normal control is carried out (step S205). Here, when the two motors are the same size, normal control means passing the same current through both of them, and when they are different sizes, normal control means allocating currents to them in correspondence with their sizes. Further, the current may be passed through only one motor instead of being passed through the two motors simultaneously.

When there is a failed motor, it is determined which motor is the failed motor and which motor is the normal motor (step S203). Here, when there is no normal motor, i.e. the failure signal K is '11', control of the electric power steering apparatus is stopped (step S206). When it is determined that there is a normal motor, i.e. when the failure signal K is either '01' or '10', the allocation of current to the normal motor is raised in accordance with the failure signal K (step S204).

Figure 13:
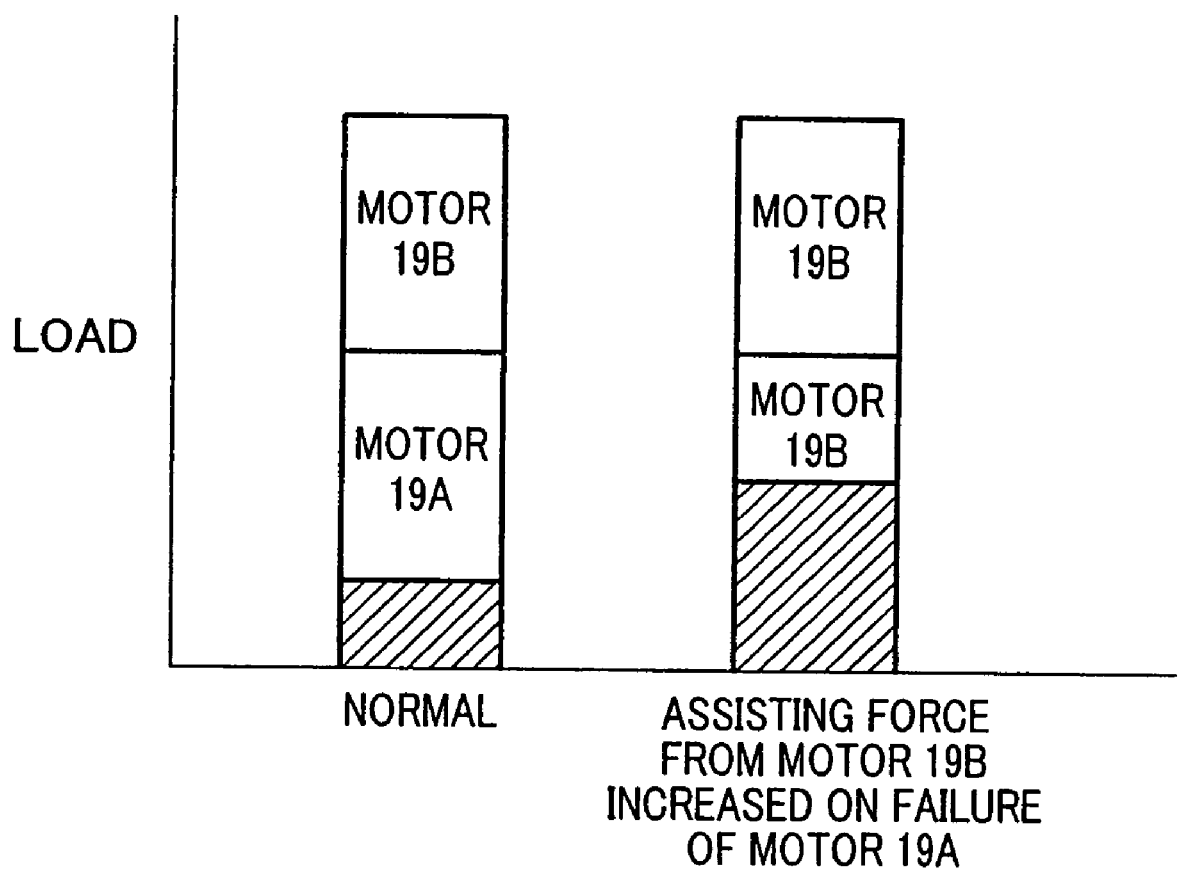
FIG. 13 is a view showing a relationship of loads on motors and a driver pertaining to the second preferred embodiment.

FIG. 13 is a view showing a relationship between loads on motors and a driver. The normal ratio of the auxiliary steering forces provided by the first motor 19A and the second motor 19B and the steering force exerted by the driver is 5:5:1. The hatching shows the steering force applied by the driver. For example, when the first motor 19A has failed, by the target current allocating part 250 shown in FIG. 10 the current supplied from the motor driving circuit 248B to the second motor 19B is increased and the auxiliary steering force provided by the second motor 19B increases. The graph on the right in FIG. 13 shows that the burden on the driver has been reduced by the auxiliary steering force of the second motor 19B. Here, the ratio of the auxiliary steering force of the second motor 19B to the steering force applied by the driver is about 7:4.

Next, a control unit of a third preferred embodiment of the invention will be described, on the basis of FIG. 14 through FIG. 17.

Figure 14:
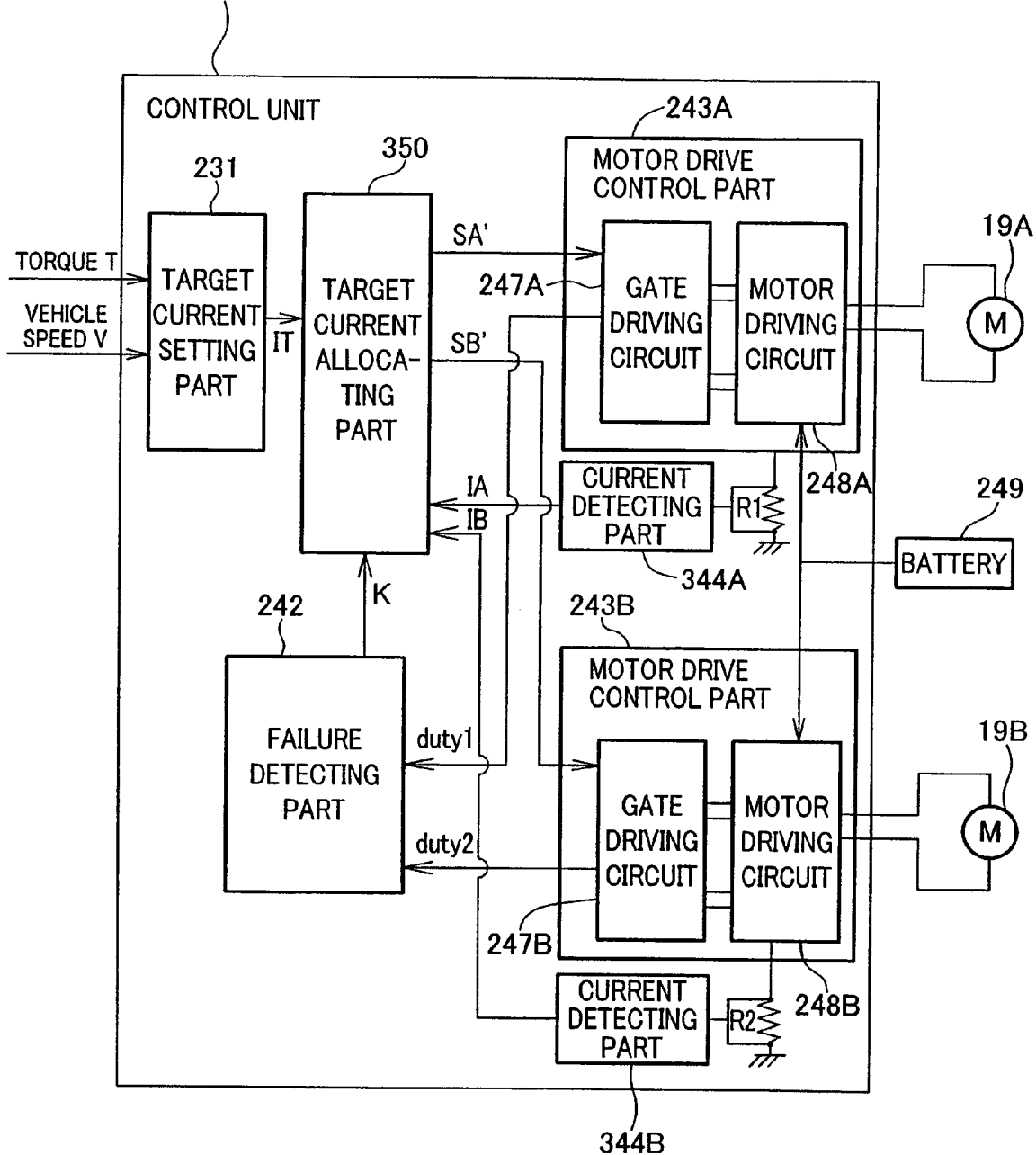
FIG. 14 is an electrical function block diagram showing the internal construction of a control unit according to a third preferred embodiment of the invention.

FIG. 14 is a block diagram showing the internal construction of a control unit 322 of a third preferred embodiment of the invention. Elements essentially the same as elements shown in FIG. 10 of the second preferred embodiment have been given the same reference numerals and will not be described again here.

The control unit 322 of this third preferred embodiment has current detecting parts 344A, 344B for measuring the currents flowing through the motor driving circuits 248A, 248B. The current detecting parts 344A, 344B detect the currents from the resistance values of shunt resistances R1, R2 and the potential differences across the shunt resistances R1, R2, and output current signals IA, IB. The detected currents flowing through the motor driving circuits 248A, 248B are inputted to a target current allocating part 350 as the current signals IA, IB.

Figure 15:
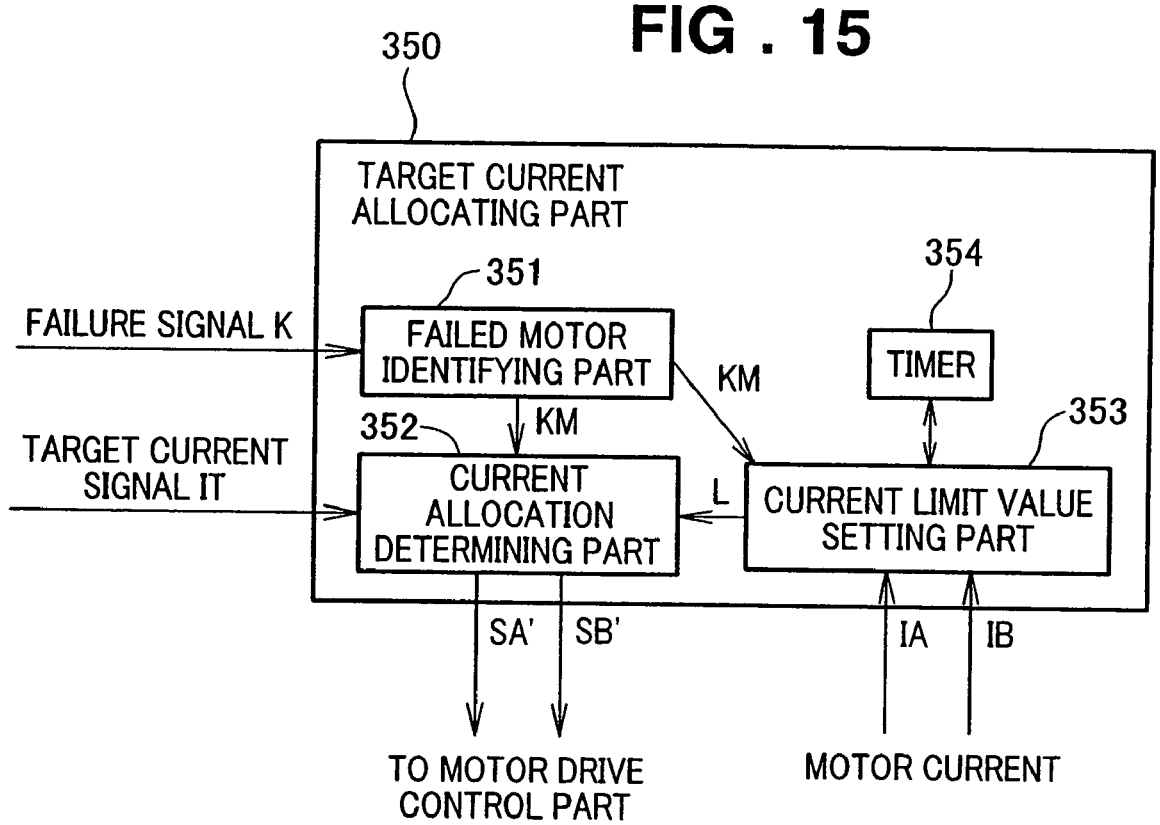
FIG. 15 is an electrical function block diagram showing a specific example of a target current allocating part pertaining to the third preferred embodiment shown in FIG. 14.

FIG. 15 is a block diagram showing the internal construction of the target current allocating part 350. The target current allocating part 350 is made up of a failed motor identifying part 351 for receiving the failure signal K and identifying the failed motor, a current allocation determining part 352 for receiving the target current signal IT and determining the motor currents to be allocated to the two motors 19A, 19B and outputting current signals SA', SB' accordingly, a current limit value setting part 353 for receiving a signal from the failed motor identifying part 351 and setting a current limit value for the normal motor, and a timer 354 operating on the basis of the current limit value and the current flowing through the motor.

The failed motor identifying part 351 identifies which motor has failed on the basis of the failure signal K, and outputs a signal KM pertaining for example to the normal motor to the current allocation determining part 352 and the current limit value setting part 353. When there has been no failure, the failed motor identifying part 351 does not output a signal KM to the current limit value setting part 353. The current limit value setting part 353 receives the signal KM pertaining to the normal motor and sets the current limit value for the normal motor to a failure current limit value. This failure current limit value, when one of the motors has failed, is set larger than the normal current limit value, to increase the auxiliary steering force provided by the normal motor. The current allocation determining part 352 receives the target current signal IT and the signal KM pertaining to the normal motor and a current limit value signal L, and determines the currents to be supplied to the first motor 19A and the second motor 19B. For example when the first motor 19A has failed and the second motor 19B is normal, it sets the current to the first motor 19A to 0 and passes a current larger than the normal current limit value through the second motor 19B in correspondence with the failure current limit value.

Figure 16:
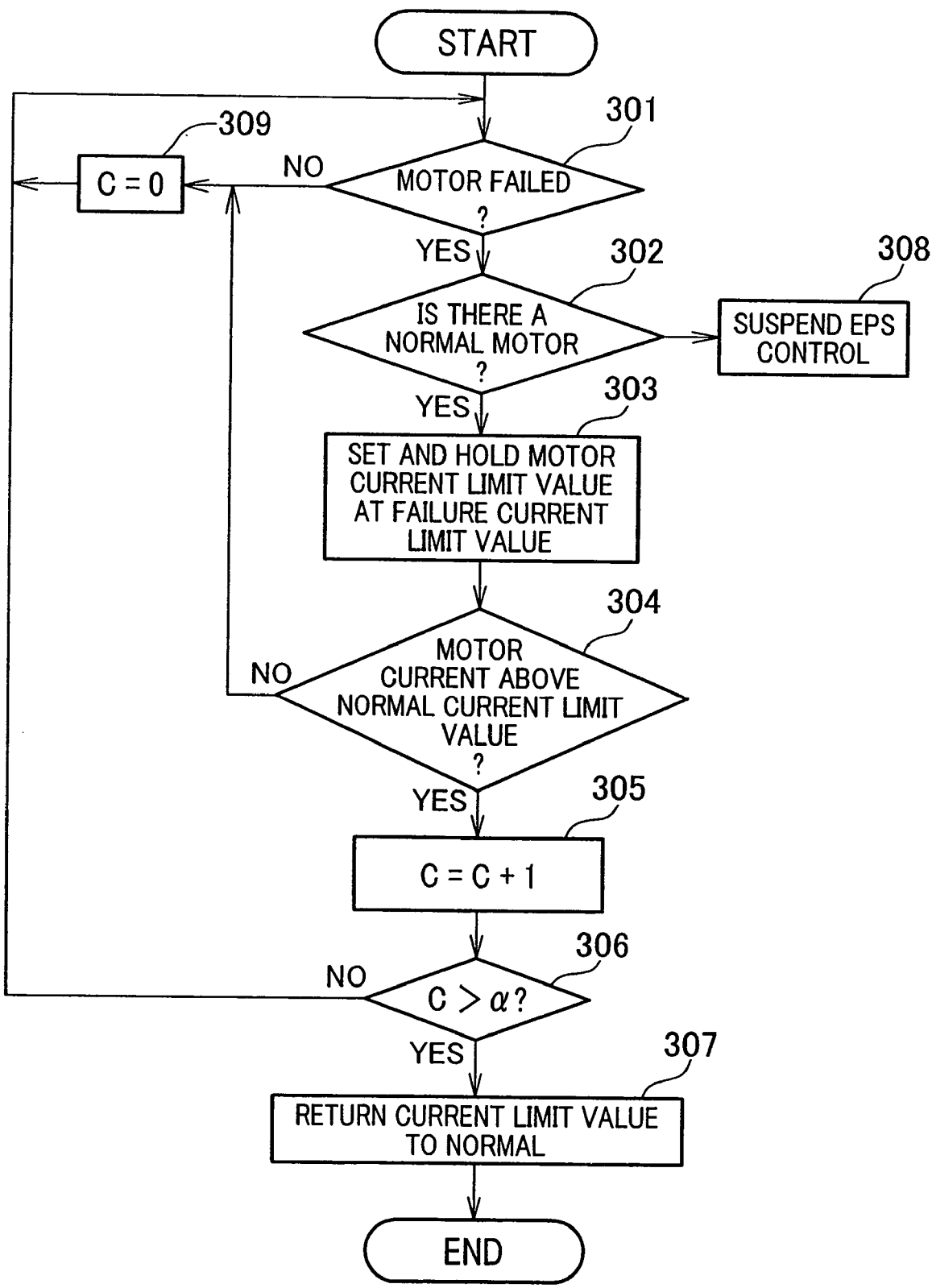
FIG. 16 is a flowchart showing the operation of the target current allocating part pertaining to the third preferred embodiment shown in FIG. 15.

Next, with further reference to FIG. 14 and FIG. 15, the operation of the control unit 322 of this third preferred embodiment will be explained on the basis of the operation flowchart for the target current allocating part 350 shown in FIG. 16.

The target current allocating part 350 receives the failure signal K from the failure detecting part 242, as shown in FIG. 14. The failure signal K is for example a 2-bit signal, with '00' meaning that the first and second motors 19A, 19B are normal, '01' meaning that the first motor 19A is normal and the second motor 19B has failed, '10' meaning that the first motor 19A has failed and the second motor 19B is normal, and '11' meaning that the first and second motors 19A, 19B have both failed.

From this failure signal K it is determined whether either or both of the two motors 19A, 19B has failed (step S301). Here, it is determined whether or not there is a '1' in either of the bits of the 2-bit signal. When there is no failed motor, i.e. when the motors are working normally, a count C, which will be further discussed later, is set to 0 (step S309). When there is a failed motor, it is determined which motor is the failed motor and which motor is the normal motor (step S302). Here, when there is no normal motor, that is, when the failure signal K is '11', control of the electric power steering apparatus is stopped (step S308). When it is determined that there is a normal motor, i.e. when the failure signal K is '01' or '10', the current limit value of the normal motor is set to a failure current limit value (step S303). Because when the current limit value of the normal motor is set to the failure current limit value a motor current greater than the normal current limit value can be passed through the normal motor, it is checked whether or not the current through the normal motor is greater than the normal current limit value (step S304). When the current through the normal motor is smaller than the normal current limit value, the count C, which will be further discussed later, is set to 0 (step S309). When the current through the normal motor is greater than the normal current limit value, the timer 354 shown in FIG. 15 is operated and the count C is incremented by 1 (step S305). The motor current being above the normal current limit value is not usually desirable, from the point of view of durability; however, if it is just for a predetermined period, the normal current limit value can be exceeded without affecting durability. Therefore, when there is a failure, it is possible to obtain an auxiliary steering force which cannot be obtained when the normal current limit value is set, by setting the current limit value to a failure current limit value. For the reason above, the predetermined time for which the motor current exceeds the normal current limit value must be within the range of durability of the motor. So, when the count C of the timer 354 has risen above a (step S306), the current limit value is returned to the normal current limit value (step S307).

In the process described above, when after the timer 354 is operated one of the motors is failed and the other motor is normal, processing passes through S303 again, but at this time the current limit value of the normal motor is held at the failure current limit value, and a comparison of the current passing through the normal motor and the normal current limit value is carried out (step S304). At this time, when the current through the normal motor is below the normal current limit value, because the load on the motor is not above normal, the count C of the timer 354 is set to 0 (step S309). By this means it is possible to operate the motor more efficiently.

Figure 17:
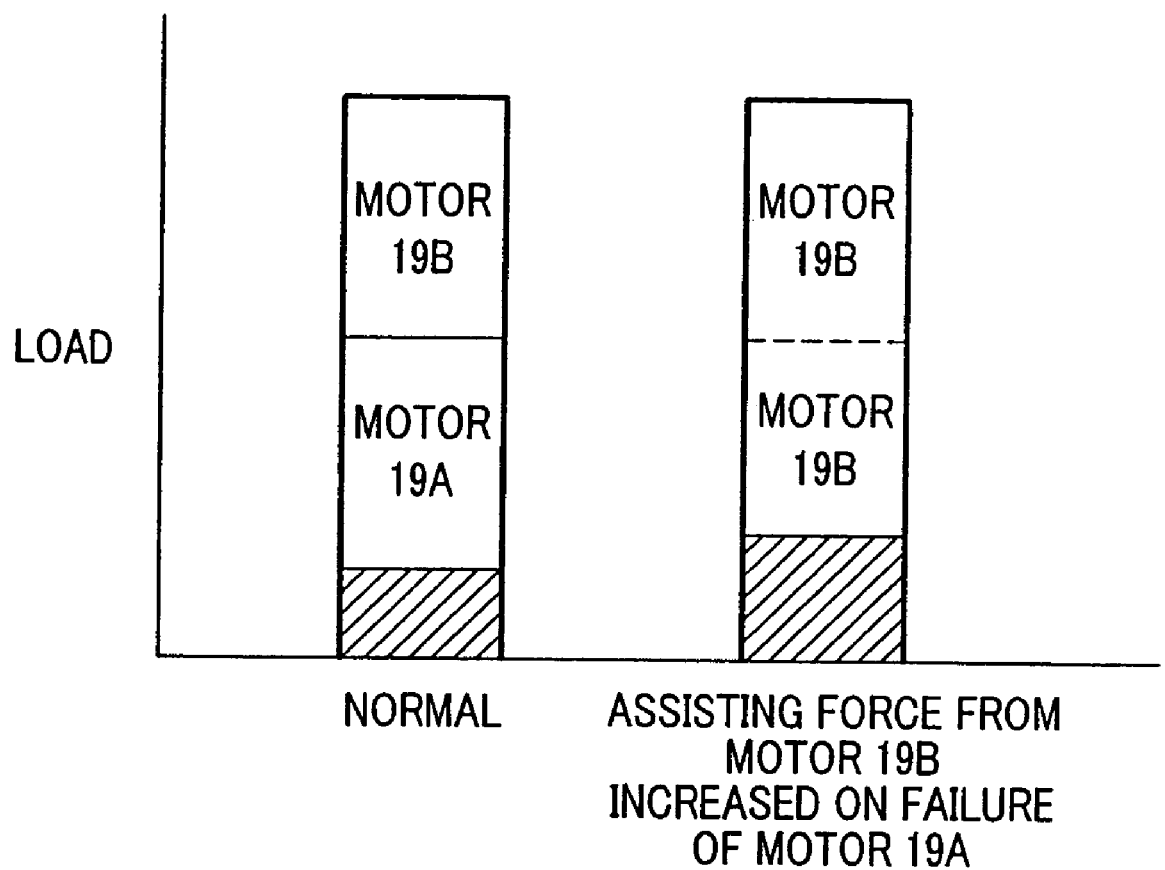
FIG. 17 is a view showing a relationship of loads on motors and a driver pertaining to the third preferred embodiment.

FIG. 17 is a view showing the relationship between the loads on the motors and the driver. It will be assumed that the normal ratio of the auxiliary steering forces of the first motor 19A and the second motor 19B and the steering force applied by the driver is 5:5:1. The hatching shows the steering force applied by the driver. For example, when the first motor 19A has failed, the current limit value setting part 353 of the target current allocating part 350 shown in FIG. 15 sets the current limit value for the second motor 19B to a failure current limit value. Consequently, a current greater than the normal current limit value can flow through the second motor 19B. As a result, the auxiliary steering force provided by the second motor 19B increases. The graph on the right in FIG. 17 shows that the auxiliary steering force provided by the second motor 19B has lightened the steering force load on the driver. And this shows that the steering force burden on the driver has been lightened more than when simply the allocation of motor current is changed, as shown in FIG. 13 of the second preferred embodiment. Here, the ratio of the auxiliary steering force from the second motor 19B to the steering force from the driver is about 8:2.

As described earlier, with an electric power steering apparatus according to the second preferred embodiment, a plurality of motors for applying steering forces to steering road wheels are provided, an allocating part for allocating auxiliary steering forces to the motors is provided, and when at least one of the motors has failed, this allocating part increases the allocation of auxiliary steering force allocated to the normal motors. And as a result, the load on the driver at times of motor failure is lightened.

In the third preferred embodiment, because a current limit value setting part for setting current limit values for the motors is provided, and when at least one of the motors has failed, the current limit value setting part sets the current limit value for a normal motor to a failure current limit value, a motor current greater than the normal current limit value can be allocated to the normal motor so as to make full use of the capacity of the normal motor, and the burden on the driver can be reduced further.

Figure 18:
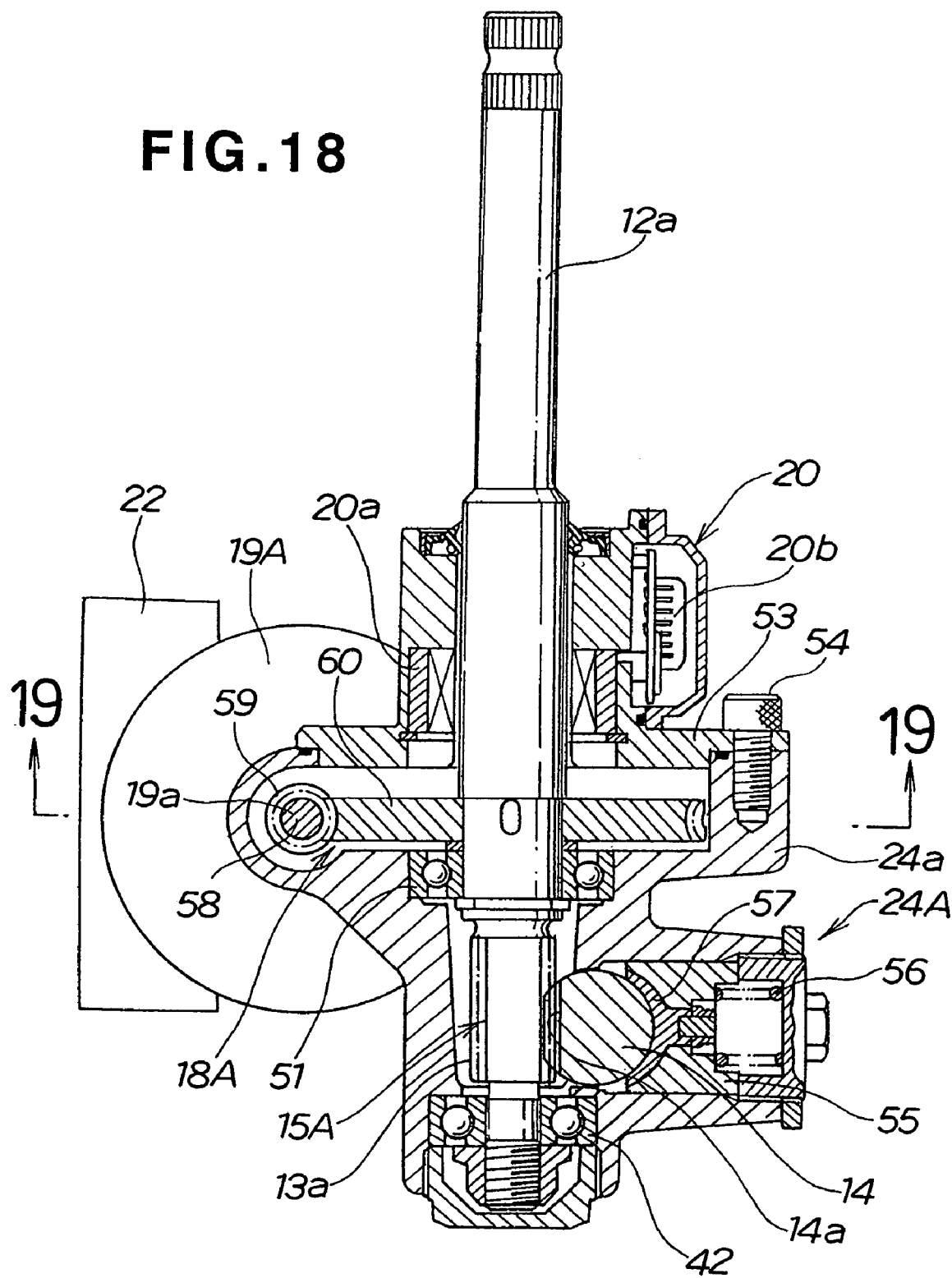
FIG. 18 is an enlarged sectional view on the line 18—18 in FIG. 1, showing the internal structure of a first gearbox.
Figure 19:
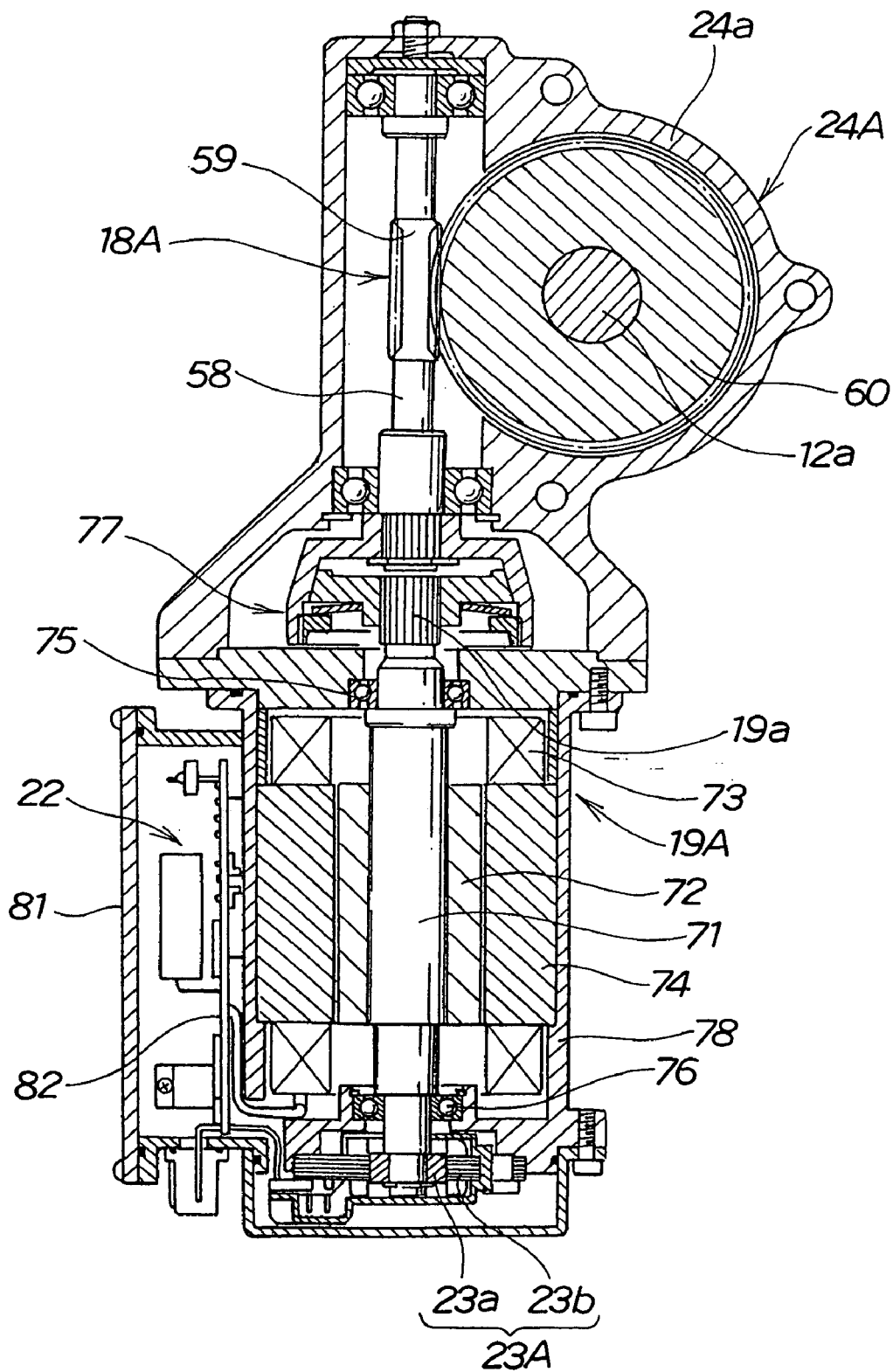
FIG. 19 is a sectional view on the line 19—19 in FIG. 18.

Next, with reference to FIG. 18 and FIG. 19, a specific example of the internal construction of the gearbox 24A and the power transmission mechanism 18A will be described. FIG. 18 is a sectional view on the line 18—18 in FIG. 1, and shows the relationship between the first motor 19A, the pinion shaft 12a and the rack shaft 14. FIG. 19 is a sectional view on the line 19—19 in FIG. 18.

In FIG. 18, in a housing 24a forming the gearbox 24A, the pinion shaft 12a is rotatably supported by two bearings 51, 52. Inside the housing 24a are housed the first rack-and-pinion mechanism 15A and the first power transmission mechanism (speed reducer) 18A, and above it is mounted the steering torque detecting part 20. An upper opening of the housing 24a is closed by a lid 53, and the lid 53 is fixed with bolts 54. The pinion gear 13A provided on the lower end of the pinion shaft 12a is positioned between the bearings 51, 52. The rack shaft 14 is pressed against the pinion gear 13A by a contact member 57 guided by a rack guide 55 and urged by a compressed spring 56. The first power transmission mechanism 18A is made up of a worm gear 59 fixed to a transmission shaft (worm shaft) 58 (see FIG. 19) connected to the output shaft 19a of the first motor 19A, and a worm wheel 60 fixed to the pinion shaft 12a.

The steering torque detecting part 20 is made up of a steering torque detection sensor 20a disposed around the pinion shaft 12a and an electronic circuit part 20b for electrically processing a detection signal outputted from the steering torque detection sensor 20a. The steering torque detection sensor 20a is attached to the lid 53.

FIG. 19 shows the first motor 19A and the internal construction of the control unit 22.

The first motor 19A has a rotor 72 made up of permanent magnets fixed to a rotating shaft 71 and a stator 74 disposed around the rotor 72. The stator 74 has a fixed winding 73. The rotating shaft 71 is rotatably supported by two bearings 75, 76. One end of the rotating shaft 71 is the output shaft 19a of the first motor 19A. The output shaft 19a of the first motor 19A is connected to the transmission shaft 58, so that rotary power is transmitted, by a torque limiter 77. The worm gear 59 is fixed to the transmission shaft 58, as mentioned above, and the worm wheel 60 meshes with this. The above-mentioned motor angle detecting part (position detecting part) 23A for detecting the angle (rotational position) of the rotor 72 of the motor 19A is provided at the other end of the rotating shaft 71.

The motor angle detecting part 23A is made up of a rotor 23a fixed to the rotating shaft 71 and a detecting device 23b which uses a magnetic action to detect the angle of this rotor 23a. For example a resolver is used as the motor angle detecting part 23A. A 3-phase a.c. motor current is supplied to the fixed winding 73 of the stator 74. The constituent elements of the first motor 19A are housed in a motor case 78.

The control unit 22 is housed in a control box 81 mounted on the outside of the motor case 78 of the first motor 19A. The control unit 22 consists of an electronic circuit made by mounting electronic circuit components on a circuit board 82. The electronic circuit components include a 1-chip microcomputer and peripheral circuitry thereof, a pre-driving circuit, a FET bridge circuit and an invertor circuit. A motor current (the drive control signal SG1A shown in FIG. 1) is supplied from the control unit 22 to the fixed winding 73 of the first motor 19A. And an angular position signal SG2A detected by the motor angle detecting part 23A is inputted to the control unit 22.

On the basis of this mechanical construction, the first motor 19A outputs a turning force (torque) for supplementing the steering torque, and this turning force is applied to the pinion shaft 12a, i.e. the steering shaft 12, via the first power transmission mechanism 18A.

Figure 20:
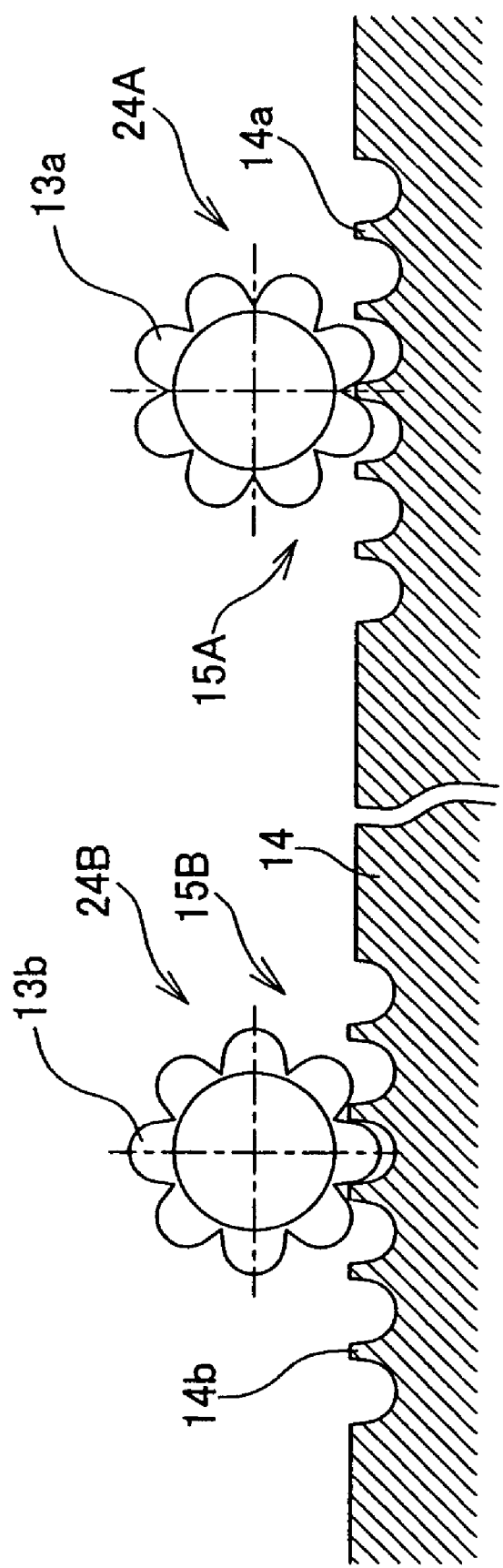
FIG. 20 is a view showing a relationship of two rack-and-pinion mechanisms at a rack shaft.
Figure 22:
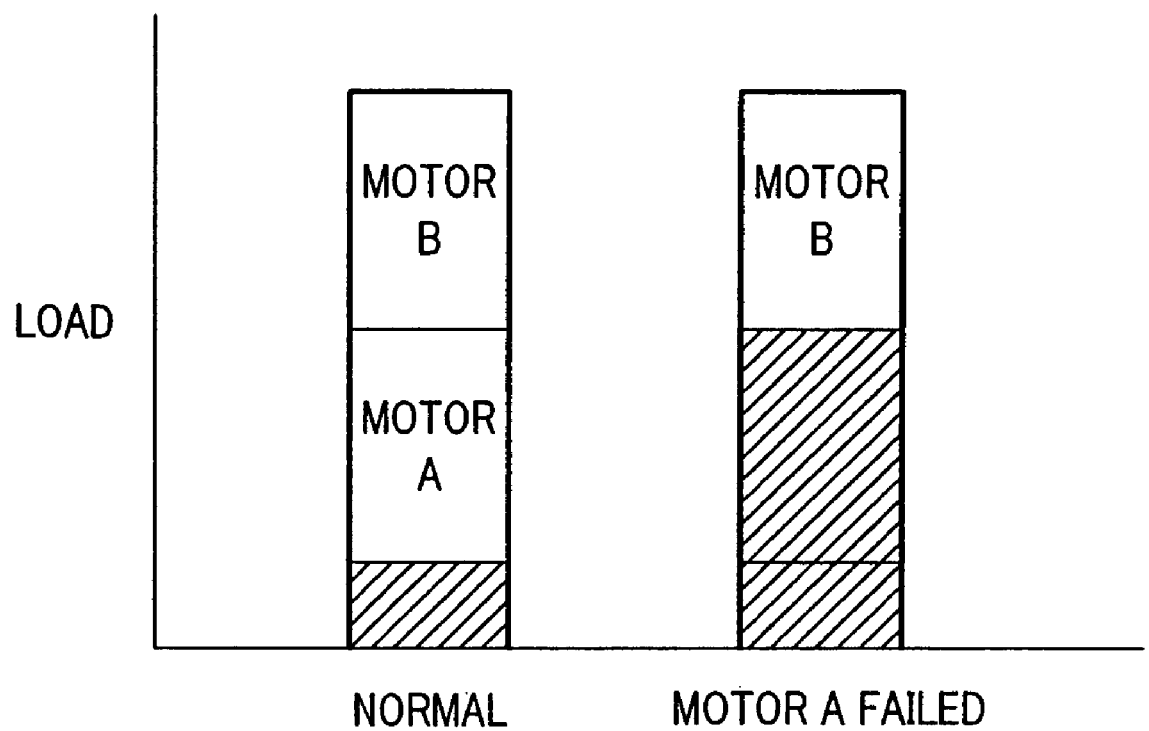
FIG. 22 is a view showing a relationship of loads on motors and a driver in an electric power steering apparatus of related art.

Next, a particular construction of a fourth preferred embodiment will be described, with reference to FIG. 2, FIG. 20 and FIG. 21. FIG. 20 shows the relationship between the first and second rack-and-pinion mechanisms 15A and 15B inside the first and second gearboxes 24A, 24B on the rack shaft 14 (shown in vertical section in the figure and with its central part truncated). FIGS. 21A and 21B show two motor torque fluctuation characteristics (a), (b) corresponding to the first and second rack-and-pinion mechanisms 15A and 15B, and FIG. 21C shows these motor torque fluctuation characteristics (c) combined.

As shown in FIG. 2, the gearboxes 24A, 24B are disposed in left and right locations in the axial direction of the rack shaft 14. The first gearbox 24A is a gearbox connecting to the pinion shaft 12a at the bottom of the steering shaft 12. The second gearbox 24B is a gearbox for incorporating the second motor 19B into the two-motor electric power steering apparatus 10 (see FIG. 1).

The first and second motors 19A, 19B are connected to the first and second first gearboxes 24A, 24B by the first and second power transmission mechanisms 18A, 18B. As shown in FIG. 1, auxiliary steering torques are applied by the rotational driving forces of the two motors 19A, 19B to the rack shaft 14, which has steering road wheels at its ends (the front wheels 17, 17). The relationship between the pinion gears and the rack gears in the two gearboxes 24A, 24B on the rack shaft 14 is as shown in FIG. 20.

In FIG. 20, first and second rack gears 14a, 14b are formed on the rack shaft 14 in locations corresponding to the two gearboxes 24A, 24B. The first and second pinion gears 13a, 13b mesh with these two rack gears 14a, 14b. The first pinion gear 13a is the pinion gear fixed to the pinion shaft 12a shown in FIG. 1. The second pinion gear 13b is the pinion gear fixed to the pinion shaft 12b (see FIG. 1) provided inside the second gearbox 24B.

As shown in FIG. 20, in the meshing relationships of the two rack gears 14a, 14b formed on the rack shaft 14 and the first and second pinion gears 13a, 13b corresponding to these rack gears, the first and second pinion gears 13a, 13b are mounted with their angular positions essentially staggered by 180° in phase.

Specifically, in this example, as shown in FIG. 20, the positional relationship is so set that when a tooth bottom of the first pinion gear 13a is positioned facing a tooth tip of the first rack gear 14a, a tooth tip of the second pinion gear 13b is positioned facing a tooth bottom of the second rack gear 14b. This meshing relationship of the gear teeth is an example, and as will be discussed in the following it may be set in any way such that the motor torque fluctuations originating in torque ripple arising in the first and second motors become reverse in phase (staggered by 180°) so that the motor torque fluctuations cancel out in the rack shaft 14.

When the positional relationships of the rack gears 14a, 14b on the rack shaft 14 and the pinion gears 13a, 13b are pre-set as described above, the characteristics 91, 92 shown in FIGS. 21A and 21B arise.

In FIGS. 21A and 21B, the horizontal axis shows angle and the vertical axis shows torque fluctuation. Accordingly, when the two motors 19A, 19B operate and power is transmitted to the rack shaft 14 by way of the two pinion gears 13a, 13b and the two rack gears 14a, 14b, in the transmission torque in the first gearbox 24A the fluctuation characteristic 91 arises, and in the transmission torque in the second gearbox 24B the fluctuation characteristic 92 arises. Because the positional relationship of the first and second pinion gears 13a, 13b was set as described above, in the waveform of the fluctuation characteristic 91 and the waveform of the fluctuation characteristic 92 the phases are completely opposite. Consequently, as shown in FIG. 21C, in the rack shaft 14 as a whole, as the torque transmitted, the fluctuation characteristics 91 and 92, which are opposite in phase, cancel each other out, the torque ripples are converged, and a suppressed torque fluctuation characteristic 93 can be obtained. As a result, it is possible to produce an auxiliary steering torque having no vibration.

With this fourth preferred embodiment, because in an electric power steering apparatus two motors having the same capabilities are used to generate an auxiliary steering torque, by staggering through 180° and thereby making opposite in phase between the two motors the phase relationships of the pinion gears and racks in the rack-and-pinion mechanisms inside the gearboxes for the respective motors, the torque ripples of the motors can be canceled out on the rack shaft 14 and vibration and noise can be eliminated.

Although in the fourth preferred embodiment described above the phases relating to the two motors 19A, 19B in the rack-and-pinion mechanisms in the first and second first gearboxes 24A, 24B were staggered by 180°, the invention is not limited to this, and alternatively for example the phases of the motors may be staggered by 180° by adjusting the relationships of the rotors and stators in the motors.

Although in the fourth preferred embodiment an electric power steering apparatus which is a mechanical transmission mechanism incorporating a speed reducer was described by way of an example, the invention is not limited to this, and may also for example be applied to a steer-by-wire system from which a mechanical linkage has been eliminated.

As described above, with this fourth preferred embodiment of the invention, because in a steering apparatus having two motors for assisting with steering the phases of the two motors are staggered by 180°, motor torque fluctuations originating in torque ripples arising in the two motors can be suppressed, vibration in the steering system can be reduced, the steering feel can be improved, and controllability can be raised. And, the need for the torque fluctuations of each individual motor to be kept small is eliminated, and the outputs of the motors can be raised at low cost.

Obviously, various minor changes and modifications of the present invention are possible in the light of the above teaching. It is therefore to be understood that within the scope of the appended claims the invention may be practiced otherwise than as specifically described.

The present disclosure relates to the subject matters of Japanese Patent Applications, No. 2002-188003 filed Jun. 27, 2002, No. 2002-239737 filed Aug. 20, 2002, and No. 2002-290812 filed Oct. 3, 2002, the disclosures of which are expressly incorporated herein by reference in their entireties.

What is claimed is:

1. A steering apparatus for transmitting a driving force of a motor through a gear mechanism to a rack shaft of a steering system and applying the driving force to steering road wheels in a steering direction, said apparatus comprising:

a first motor; and
a second motor,
wherein in the transmission of driving forces from output shafts of the first and second motors to the rack shaft the phases of the two motors are essentially staggered by 180°.

2. A steering apparatus according to claim 1, wherein the gear mechanism is a rack-and-pinion gear mechanism and in the meshing relationship of two pinion gears connected to the outputs shafts of the two motors and a rack gear the phases of the two pinion gears are essentially staggered by 180°.

3. A steering apparatus according to claim 1, wherein between the two motors a waveform pertaining to motor torque fluctuation arising from one of the motors and a waveform pertaining to motor torque fluctuation arising from the other motor are set so as to be opposite in phase.

4. A steering apparatus according to claim 1, wherein the two motors are assisting motors of an electric power steering apparatus for supplementing a manual steering force.

* * * * *